United States Patent
Mita et al.

(10) Patent No.: US 8,440,343 B2
(45) Date of Patent: May 14, 2013

(54) ELECTRICITY STORAGE SYSTEM AND METAL BATTERY CASE MANUFACTURING METHOD

(75) Inventors: Yoshinori Mita, Saitama (JP); Atsushi Sakurai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1035 days.

(21) Appl. No.: 12/428,651

(22) Filed: Apr. 23, 2009

(65) Prior Publication Data

US 2009/0269657 A1    Oct. 29, 2009

(30) Foreign Application Priority Data

Apr. 25, 2008  (JP) ................. 2008-116149
Apr. 25, 2008  (JP) ................. 2008-116150

(51) Int. Cl.
*H01M 2/16* (2006.01)
(52) U.S. Cl.
USPC ........... 429/143; 429/138; 429/148; 429/151; 429/154; 429/163; 429/167; 429/168; 429/176

(58) Field of Classification Search .................. 429/138, 429/143, 146, 148, 151, 154, 163, 167, 168, 429/176
See application file for complete search history.

(56) References Cited

U.S. PATENT DOCUMENTS

| 6,566,004 B1* | 5/2003 | Fly et al. ................. 429/434 |
| 2006/0246348 A1* | 11/2006 | Hamada et al. ............. 429/148 |

FOREIGN PATENT DOCUMENTS

| JP | 2004-362879 A | 12/2004 |
| JP | 2005-005167 A | 1/2005 |

* cited by examiner

*Primary Examiner* — Patrick Ryan
*Assistant Examiner* — Ben Lewis
(74) *Attorney, Agent, or Firm* — Westerman, Hattori, Daniels & Adrian, LLP

(57) ABSTRACT

An electricity storage system comprises a plurality of battery cells in which battery elements are accommodated in angular metal battery cases, wherein the plurality of battery cells are connected together electrically and are disposed in such a manner as to form spaces between the metal battery cells, and wherein the metal battery cell comprises an angular metallic housing on an external surface of which irregularities are formed and a resin portion which is injection molded integrally on the external surface of the metallic housing.

12 Claims, 19 Drawing Sheets

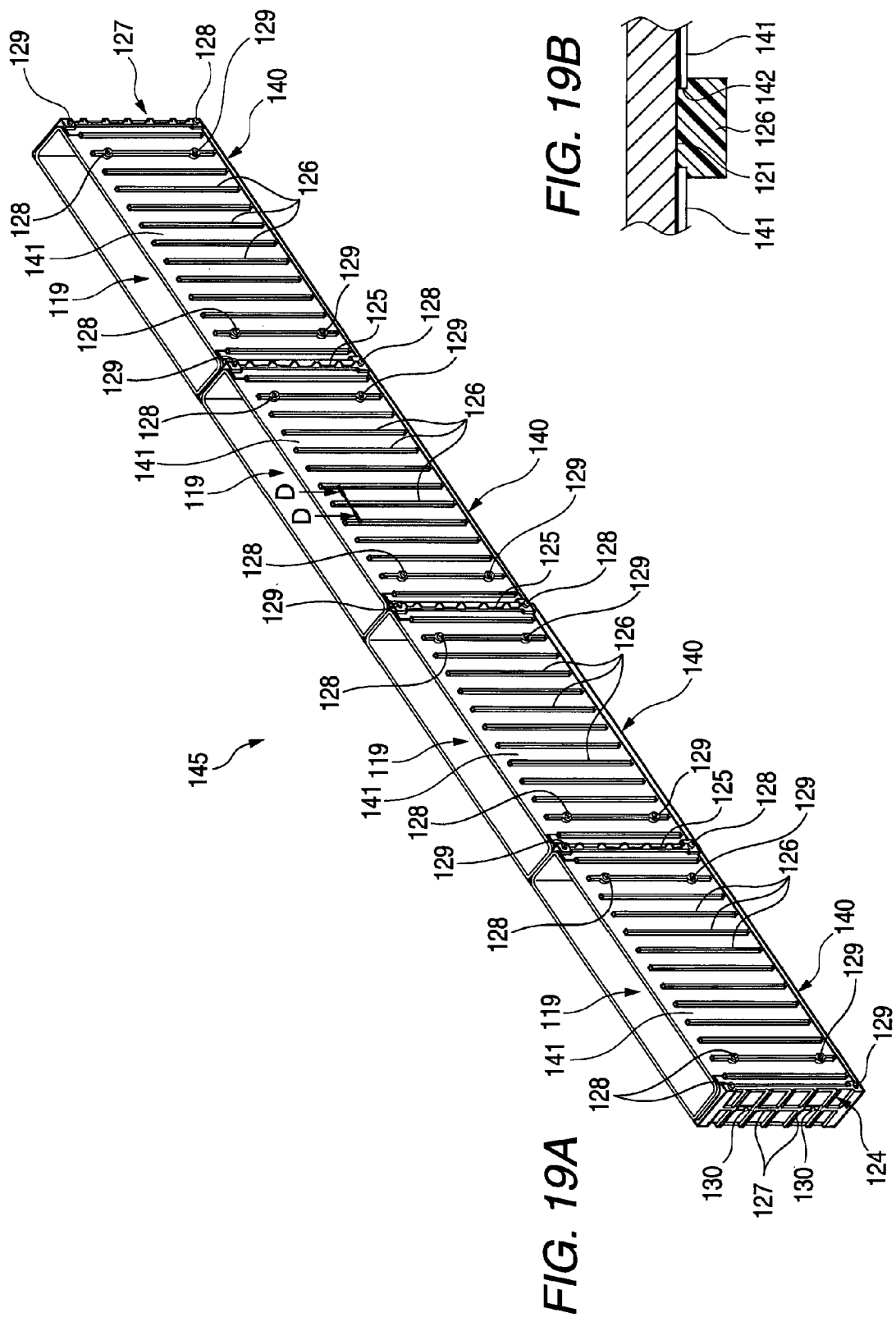

ELECTRICITY STORAGE SYSTEM AND METAL BATTERY CASE MANUFACTURING METHOD

TECHNICAL FIELD

The present invention relates to an electricity storage system mounted on fuel cell vehicles, electric vehicles, plug-in hybrid vehicles and hybrid vehicles and a metal battery case manufacturing method.

RELATED ART

In general, an electricity storage system which is made up of a stack of a plurality of battery cells such as nickel-hydrogen batteries and lithium batteries is used as a driving power supply for an electric vehicle or the like. In an electricity storage system like this, a plurality of angular battery cells are stacked together so as to realize conservation of space. In addition, the electricity storage system may sometimes be necessary to be cooled to suppress an increase in temperature due to heat generated during charging and discharging or heated when it is cooled more than necessary.

As related-art electricity storage systems, an electricity storage system is known in which heat insulation members each having a heat insulation layer which covers the whole surface of an angular battery are interposed between adjacent angular batteries and passageways through which a cooling medium is caused to flow are provided between the heat insulation members and the angular batteries (for example, refer to Patent Document 1). In addition, an electricity storage system is known which includes a binding jig which has connecting members which are provided at both ends of a plurality of battery modules made up of a combination of single batteries and are passed through spaces between the single batteries (for example, refer to Patent Document 2).

In addition, when a battery module or battery assembly is formed by combining together a plurality of batteries which use metal battery cases, it is known to dispose heat-shrinkable tubes or to laminate films to external surfaces of the metal battery cases in order to electrically isolate the metal battery cases from each other or to protect the metal battery cases.
[Patent Document 1] JP-A-2004-362879
[Patent Document 2] JP-A-2005-5167

Incidentally, in the electricity storage systems described in Patent Document 1 and Patent Document 2 above, since the battery stack includes separate components on which projections such as ribs are formed and which are interposed so as to provide the passageways through which the cooling medium is caused to flow between the adjacent angular batteries, it has been difficult to realize a reduction in size, weight and production cost, and hence, there has been room for improvement. In addition, when protection films having electrical insulating properties are applied to the external surfaces of the metal battery cases, in the event that this is implemented by the use of heat-shrinkable tubes, there has been caused a problem that wrinkles in the heat-shrinkable tubes and/or separations thereof from the external surfaces of the metal battery cases occur in corner portions of the metal battery cases. In addition, in the event that the laminated films are used, there has been a possibility that the metal surfaces of the metal battery cases are exposed at end portions of the laminated films or the separation of the laminated films from the metal surfaces occurs due to deterioration with age of the adhesive.

SUMMARY

Exemplary embodiments of the present invention provide an electricity storage system which can prevent the deformation of metal battery cases due to internal pressure of battery cells, ensure passageways for a cooling medium, realize a reduction in size and weight by reducing the number of components involved and reduce the production costs and a manufacturing method of a metal battery case.

According to a first aspect of the invention, there is provided an electricity storage system comprising:
a plurality of battery cells (for example, battery cells 11 in an embodiment), each of which includes an angular metal battery case (for example, metal battery cases 12 in the embodiment) and a battery element accommodated in the metal battery case, the plurality of battery cells being electrically connected together and disposed in such a manner as to form spaces between the metal battery cases,
wherein each of the metal battery cases has:
an angular metallic housing (for example, a metallic housing 17 in the embodiment) having an external surface (for example, an external surface 18 in the embodiment) on which irregularities are formed, and
a resin portion (for example, a resin portion 19 in the embodiment) which is integrally molded on the external surface of the metallic housing through integral injection molding.

According to a second aspect of the invention, there is provided a method for manufacturing an angular metal battery case which accommodates a battery element so as to configure a battery cell, the method comprising:
a working step of forming an angular metallic housing by pressing a sheet metal;
a surface treatment step of forming irregularities on an external surface of the metallic housing; and
a molding step of integrally molding a resin portion on the external surface of the metallic housing by insert molding with the metallic housing inserted According to a third aspect of the invention, there is provided an electricity storage system comprising:
a plurality of battery cells (for example, battery cells 111 of an embodiment), each of which includes an angular metal battery case (for example, metal battery cases 113 in the embodiment) having an angular metallic housing (for example, metallic housings 119 in the embodiment) with an external surface (for example, an external surface 120 in the embodiment) on which irregularities are formed, and a battery element accommodated in the metallic housing of the metal battery case, the plurality of battery cells being electrically connected together and disposed in such a manner as to form spaces between the metal battery cases,
wherein a metal battery case assembly (for example, a metal battery case assembly 114 in the embodiment) is formed by insert molding the plurality of angular metallic housings inserted which are disposed so as to be aligned in a straight line, and
wherein the metal battery case assembly comprises connecting portions (for example, connecting portions 125 in the embodiment) which connect the plurality of metallic housings together and resin portions (for example, resin portions 124 in the embodiment) which are formed on external surfaces of the metallic housings.

According to a fourth aspect of the invention, there is provided a method of manufacturing an angular metal battery case which accommodates a battery element so as to configure a battery cell, the method comprising:
a working step of forming an angular metallic housing by pressing a sheet metal;
a surface treatment step of forming irregularities on an external surface of the metallic housing; and a molding step of connecting the plurality of metallic housings which are disposed so as to be aligned in a straight line together by insert molding with the plurality of metallic housings inserted and integrally molding resin portions on external surfaces of the plurality of metallic housings so connected together.

Other features and advantages may be apparent from the following detailed description, the accompanying drawings and the claims.

BRIEF DESCRIPTION OF THE DRAWINGS

FIG. 19A is a perspective view of a metal battery case assembly of the fourth embodiment.

FIG. 19B is a sectional view taken along the line D-D and seen in a direction indicated by arrows D of FIG. 19A.

DETAILED DESCRIPTION

Figure 1:
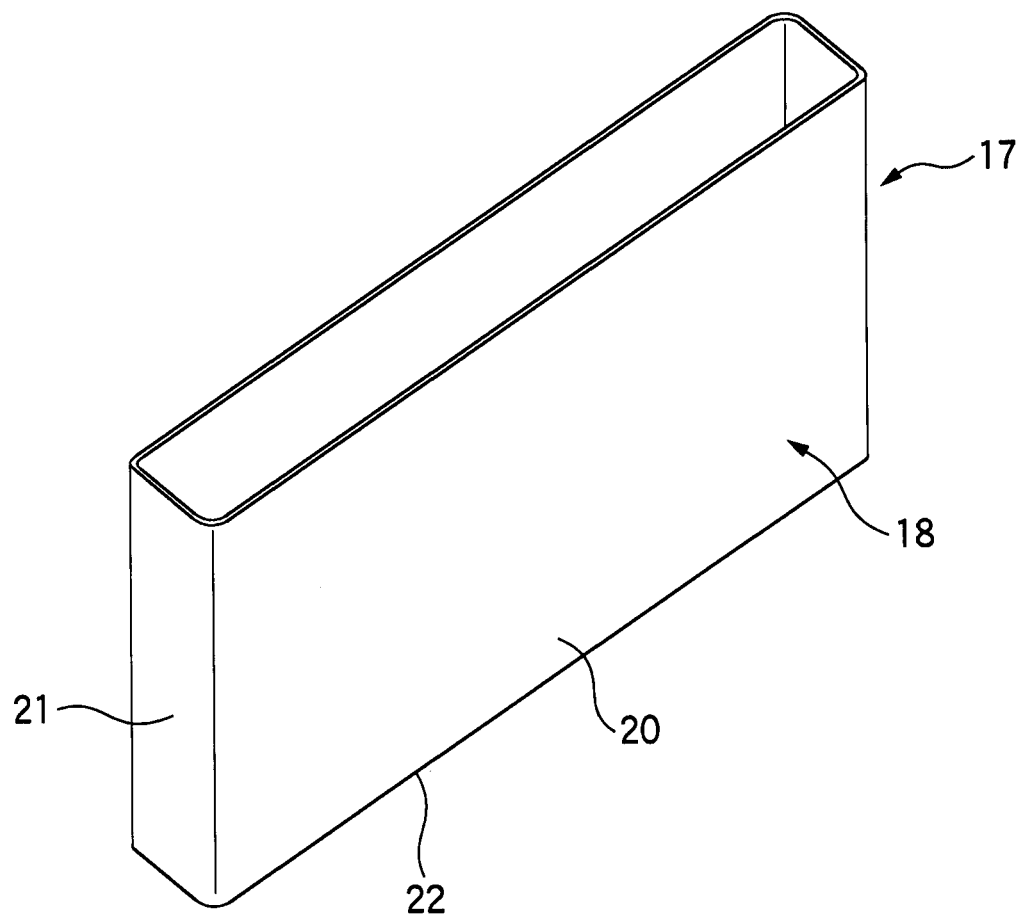
FIG. 1 is a perspective view illustrating a metallic housing constituting an electricity storage system and used in a metal battery case manufacturing method according to the invention.

Hereinafter, respective embodiments of electricity storage systems and metal battery case manufacturing methods according to the invention will be described in detail based on the accompanying drawings. Note that the drawings are to be seen in a direction in which given reference numerals are seen properly.

First Embodiment

Firstly, referring to FIGS. 1 to 4, a first embodiment of an electricity storage system and a metal battery case manufacturing method according to the invention will be described.

As is shown in FIGS. 1 to 4, an electricity storage system 10 of this embodiment is made up of a plurality of battery cells 11 such as lithium batteries, for example, which are disposed to be stacked together. This battery cell 11 includes mainly an angular metal battery case 12 which has a rectangular parallelepiped external shape, a battery element, not shown, which is accommodated within the metal battery case 12 with a positive terminal 13 and a negative terminal 14 connected electrically and a lid portion 15 which closes an upper opening of the metal battery case 12.

The lid portion 15 is joined to the upper opening of the metal battery case 12 with the positive terminal 13 and the negative terminal 14 exposed to the outside, and a gas discharge valve 16 is provided at a substantially central portion of the lid portion 15 for discharging gases produced within the battery cell 11.

Figure 2A:
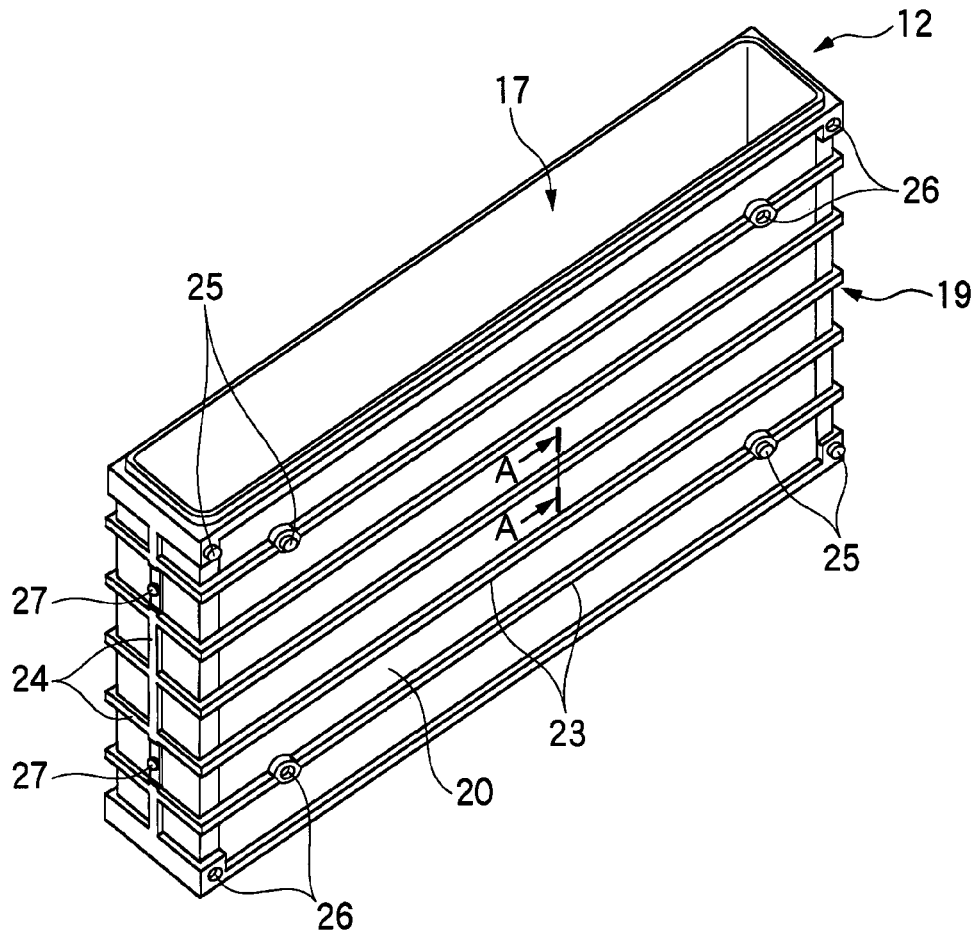
FIG. 2A is a perspective view of a metal battery case of a first embodiment of the electricity storage system according to the invention.
Figure 2B:
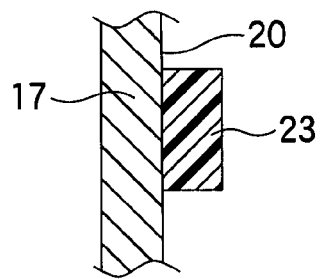
FIG. 2B is a sectional view taken along the line A-A and seen in a direction indicated by arrows A of FIG. 2A.

As is shown in FIG. 2A, the metal battery case 12 includes a metallic housing 17 which is formed into a bottomed rectangular parallelepiped box by pressing a thin plate of aluminum or copper-based metal and a resin portion 19 which is integrally molded on an external surface 18 of the metallic housing 17 by integral injection molding. This resin portion 19 is formed by insert molding from a synthetic resin such as a PBT resin or a PPS resin with the metallic housing 17 inserted therein by the use of a normal injection molding apparatus.

In addition, in this embodiment, a special surface treatment is applied to the external surface 18 of the metallic housing 17 prior to the injection molding, as a result of which the external surface 18 has extremely minute irregularities of a nanometer level (20 nm to 30 nm). In addition, the special surface treatment applied to the aluminum or copper-based metal surface will be described later.

Additionally, the resin portion 19 has a plurality of ribs 23 which are formed on long side surfaces 20 of the metallic housing 17 in such a manner as to cross them horizontally and a plurality of ribs 24 which are formed on short side surfaces 21 and a bottom surface 22 of the metallic housing 17 in such a manner as to cross them horizontally and vertically. On the ribs 23 so formed, circular cylindrical projecting portions 25 are formed in an upper leftward position and a lower rightward position and at a top left-hand side corner portion and a bottom right-hand side corner portion, and circular recessed portions 26 are formed in a lower leftward position and an upper rightward position and at a bottom left-hand side corner portion and a top right-hand side corner portion. In addition, on the ribs 23 formed on the back side of the metal battery case, recessed portions 26 are formed in positions which correspond to the projecting portions 25 on the front side, and projecting portions 25 are formed in positions which correspond to the recessed portions 26 on the front side. In addition, an outside diameter of the projecting portion 25 and an inside diameter of the recessed portion 26 are the same, and when a plurality of battery cells 11 are stacked together, the projecting portions 25 and the recessed portions 26 are fitted in and on each other, whereby the adjacent battery cells 11 are positioned relative to each other. In addition, a pair of circular cylindrical projecting portions 27 is formed on the rib 24 on each of the short side surfaces 21.

Figure 4:
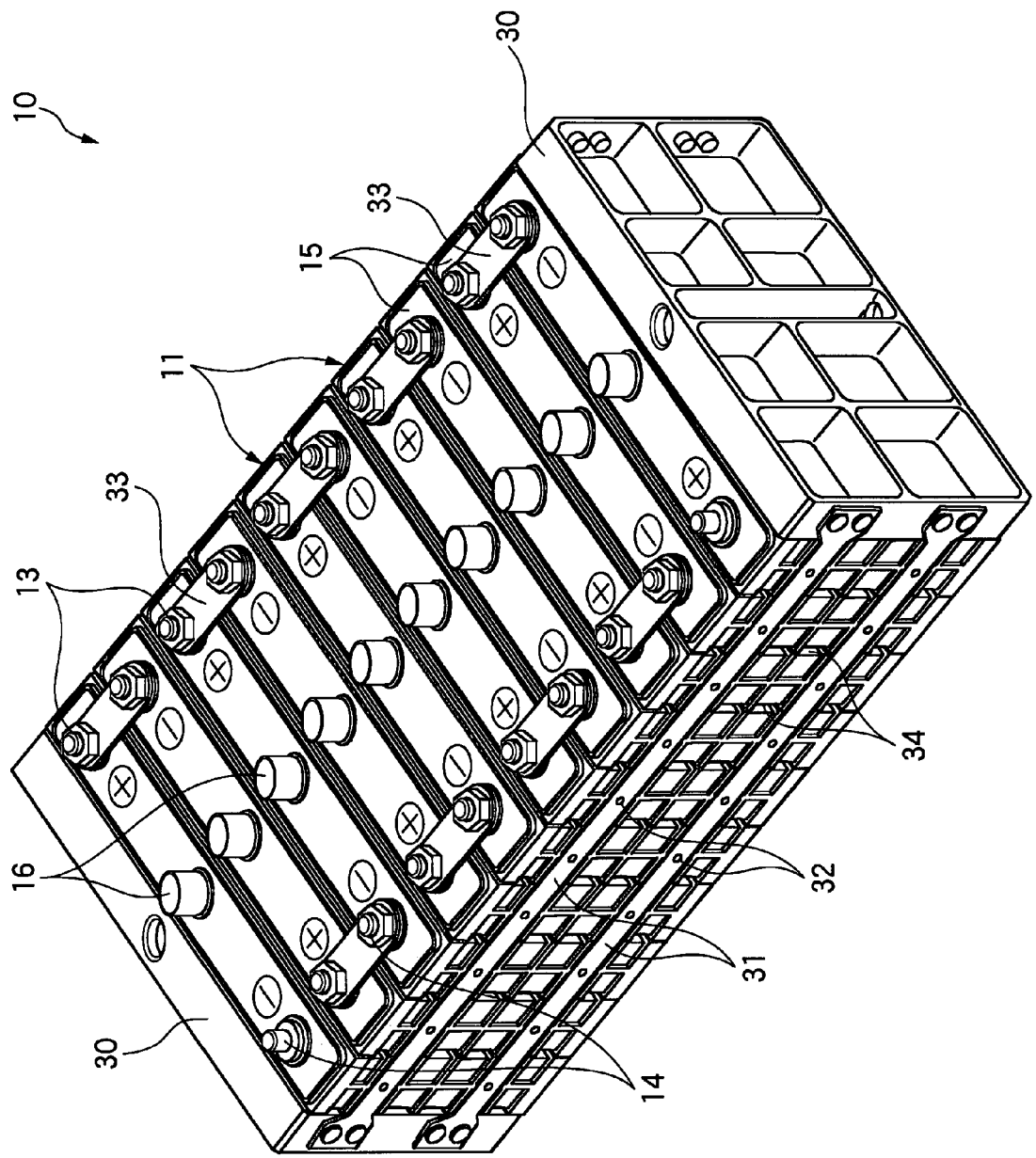
FIG. 4 is a perspective view of a first embodiment of an electricity storage system according to the invention.

In addition, in this embodiment, as is shown in FIG. 4, a plurality of (10 in this embodiment) battery cells 11 are disposed in such a manner that positive terminals 13 and negative terminals 14 are aligned alternately and are stacked together while being positioned by causing the projecting portions 25 and the recessed portions 26 on the adjacent battery cells 11 to fit in and on each other. As this occurs, the ribs 23, 24 on the metal battery cases 12 are brought into close contact with each other so as to configure a post-like structure to thereby enhance the rigidity of the overall electricity storage system 10.

Additionally, in this embodiment, highly rigid tight-pressing plates 30 are disposed at the long side surfaces 20 of the end battery cells 11 of the stacked battery cells 11. In addition, biding plates 31 in which engagement holds 32 are formed at constant intervals are disposed on both the short side surfaces 21 of the stacked battery cells 11, and the engagement holes 32 are caused to fit on the projecting portions 27 on the ribs 24 and both end portions of the binding plates 31 are fixed to the tight-pressing plates 30, whereby the stacked battery cells 11 are fixed altogether. In addition, the electricity storage system 10 is completed by connecting electrically the positive terminals 13 and the negative terminals 14 together by conductive members 33 such as copper plates.

In the electricity storage system 10 configured in the way described above, since cooling medium passageways 34 are defined between the adjacent battery cells 11 by the ribs 23 and the long side surfaces 20 of the battery cells 11, by cooling air or the like being caused to flow through these cooling medium passageways 34, heat generated in association with charging and discharging of the battery cells 11 is suppressed effectively so as to prevent an increase in temperature thereof, whereby a reduction in electric properties of the battery cells 11 is suppressed.

Next, a manufacturing method of the metal battery case 12 will be described. Firstly, a sheet of aluminum is deep drawn to be formed into a bottomed rectangular parallelepiped shape for manufacturing a metallic housing 17 (a working step). Following this, a special surface treatment is applied to an external surface 18 of the metallic housing 17 to form ultra minute irregularities of a nanometer level on the external surface 18 (a surface treatment step). Then, an insert molding is implemented with the metallic housing 17 inserted to the external surface 18 of which the special surface treatment was applied by the use of a normal injection molding machine to form ribs 23, 24, projecting portions 25, 27 and recessed portions 26 which configure a resin portion 19 on long side surfaces 20, short side surfaces 21 and a bottom surface 22 of the metallic housing 17 (a molding step). By this series of steps, a synthetic resin enters dimples having, for example, a diameter of 20 to 30 nm which are formed on the external surface 18 by the special surface treatment to thereby mold a resin portion 19, whereby a metal battery case 12 is manufactured to the external surface 18 of which the resin portion 19 is fixed strongly and rigidly.

In addition, as the special surface treatment adopted in this embodiment, an immersion treatment or an organic plated film treatment is adopted; in the immersion treatment, after an alkali treatment in which the metallic housing is immersed in an alkali solution and an acid treatment in which the metallic housing is immersed in an acid solution are carried out, the metallic housing is immersed in an irregularities forming solution, and in the organic plated film treatment, an organic plating treatment by a triazine dithiol dielectric is applied to the external surface 18 of the metallic housing 17 in an electrolytic cell containing an electrolyte in which triazine dithiol dielectric is dissolved in water or an organic solution so as to form a film of triazine dithiol dielectric on the metallic surface.

Figure 3:
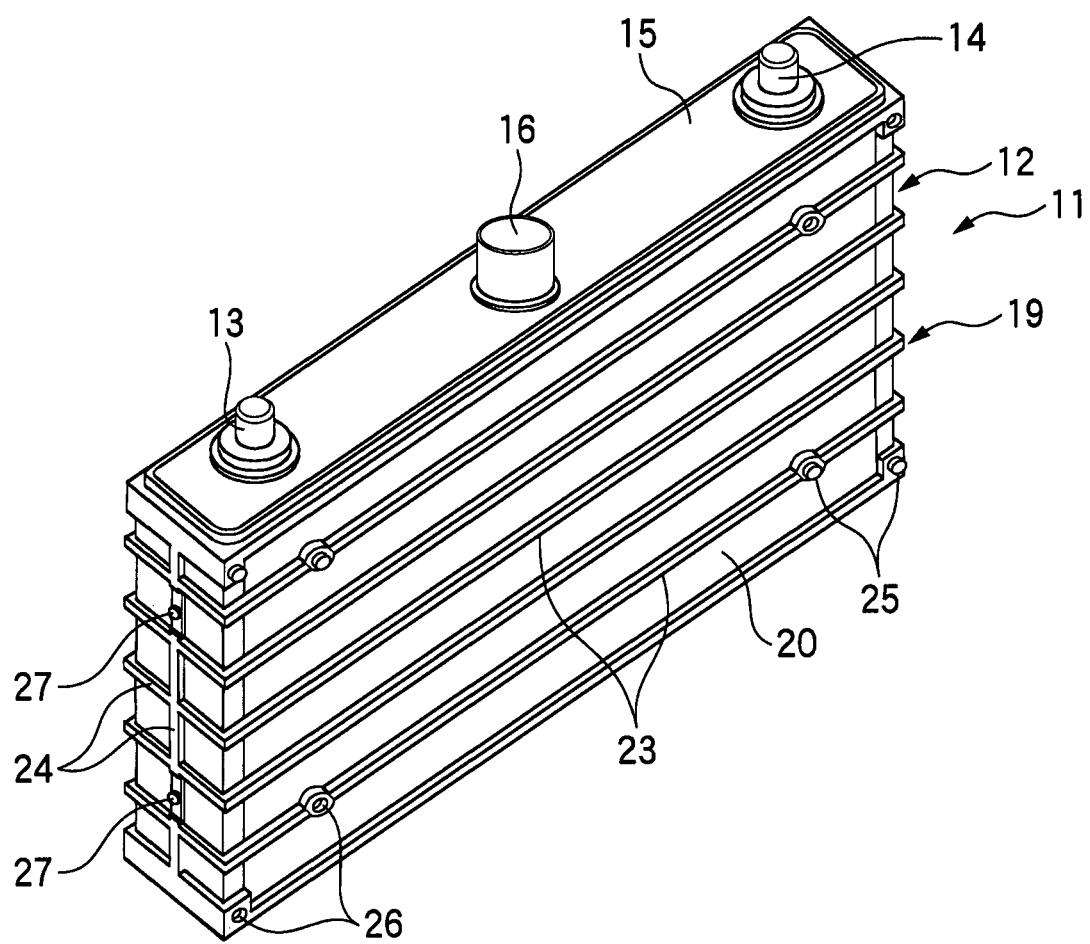
FIG. 3 is a perspective view of a battery cell of the first embodiment of the electricity storage system according to the invention.

Then, a battery element, not shown, is accommodated in an interior of the metal battery case 12, and an electrolyte is poured thereinto so that the battery element is immersed therein. Thereafter, as is shown in FIG. 3, a lid portion 15 is airtightly joined to an upper opening of the metal battery case 12, whereby a battery cell 11 is manufactured.

Thus, as has been described heretofore, according the electricity storage system 10 of the embodiment, since the metal battery case 12 includes the angular metallic housing 17 on the external surface 18 of which the irregularities of the nanometer level are formed and the resin portion 19 which is integrally molded on the external surface 18 of the metallic housing 17 through integral injection molding, the resin portion 19 can be fixed to the external surface 18 of the metallic housing 17 strongly and rigidly.

In addition, according the electricity storage system 10 of the embodiment, since the resin portion 19 configures the ribs 23 which are formed on the long side surfaces 20 of the metal battery case 12, the mechanical strength of the long side surfaces 20 of the metal battery case 12 can be enhanced, and therefore, the deformation of the long side surfaces 20 of the metal battery case 20 due to the internal pressure of the battery cell 11 can be prevented. Additionally, since the cooling medium passageways 34 through which cooling air or the like is allowed to flow can be formed between adjacent battery cells 11 when they are stacked together by the ribs 23 so formed, heat generated in association with charging and discharging of the battery cells 11 can be cooled effectively, thereby making it possible to prevent the increase in the temperatures of the battery cells 11, whereby the reduction in electric properties of the battery cells 11 can be suppressed. In addition, since separate members for forming the cooling medium passageways 34 do not have to be prepared additionally, a reduction in size and weight of the electricity storage system 10 can be realized, and the production costs thereof can also be reduced.

In addition, according to the electricity storage system 10 of the embodiment, since the resin portion 19 configures the ribs 24 which are formed on the short side surfaces 21 and the bottom surface 22 of the metal battery case 12, the mechanical strength of the short side surfaces 21 and the bottom surface 22 of the metal battery case 12 can be enhanced, and therefore, the deformation of the short side surfaces 21 and the bottom surface 22 of the metal battery case 12 due to the internal pressure of the battery cell 11 can be prevented.

Additionally, according the electricity storage system 10 of the embodiment, since the resin portion 19 configures the ribs 24 which are formed on the short side surfaces 21 and the bottom surface 22 of the metal battery case 12 and when a plurality of battery cells 11 are stacked together, the battery cells 11 so stacked together configure a post-like structure, the plurality of battery cells 11 can be assembled integrally, thereby making it possible to enhance the rigidity of the overall electricity storage system 10.

In addition, according to the electricity storage system 10 of the embodiment, since the resin portion 19 includes at least a recessed portion 26 and a projecting portion 25 which make a pair and when a plurality of battery cells 11 are stacked together, the recessed portions 26 and the projecting portions 25 of the adjacent battery cells 11 fit on and in each other to position the battery cells 1 relative to each other, the assembling properties of the electricity storage system 10 can be enhanced. In addition, since the assembling rigidity of the plurality of battery cells 11 can be enhanced, the reliability and safeness of the electricity storage system 10 can be enhanced when it is used under severe service conditions as in a motor vehicle.

Additionally, according to the metal battery case 12 manufacturing method of the embodiment, since the manufacturing method includes the working step of pressing the sheet metal to form it into the angular metallic housing 17, the surface treatment step of forming the irregularities of the nanometer level on the external surface 18 of the metallic housing 17, and the molding step of implementing the insert molding with the metallic housing 17 inserted so as to mold integrally the resin portion 19 on the external surface 18, the metal battery case 12 can easily be manufactured in which the resin portion 19 is fixed strongly and rigidly to the external surface 18 of the metallic housing 17.

Second Embodiment

Next, referring to FIGS. 5A to 10B, a second embodiment of an electricity storage system and a manufacturing method of a metal battery case according to the invention will be described. Note that since an electricity storage system of this embodiment is similar to the electricity storage system of the first embodiment except that a resin portion is injection molded with protection films disposed on long side surfaces of a metallic housing, by imparting like reference numerals or corresponding reference numerals to like portions, the description thereof will be simplified or omitted.

Figure 5A:
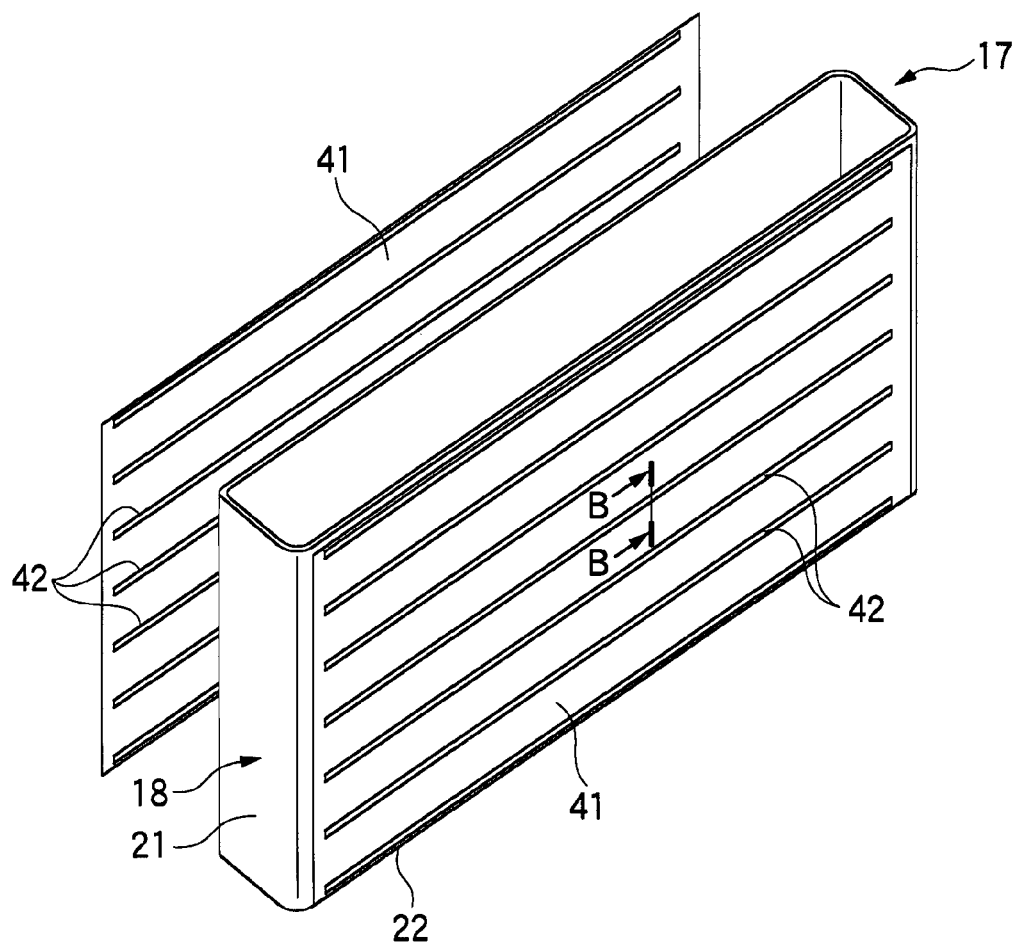
FIG. 5A is a perspective view of a metallic housing of a second embodiment of the electricity storage system according to the invention with a protection film fastened temporarily on an external surface of the metallic housing.
Figure 5B:
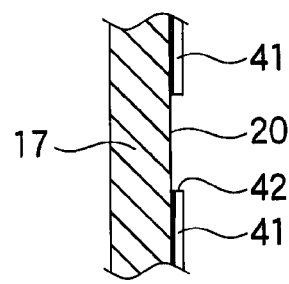
FIG. 5B is a sectional view taken along the line B-B and seen in a direction indicated by arrows B of FIG. 5A.

As is shown in FIG. 5A, a metal battery case 40 of this embodiment includes a metallic housing 17 (refer to FIG. 1) in which as with the first embodiment, irregularities of a nanometer level are formed on an external surface 18, protection films 41 which are fastened temporarily to long side surfaces 20 of the metallic housing 17 with an adhesive or adhesive tape and a resin portion 19 which is integrally molded on the external surface 18 of the metallic housing 17 which is exposed from the protection films 41 in such a manner as to cover edge portions of the protection films 41.

The protection film 41 has insulation properties and has substantially the same size as that of the long side surface 20 so as to cover almost the whole surface of the long side surface 20. In addition, a plurality of (seven in this embodiment) slit 42 are formed in the protection film 41 in such a manner as to extend horizontally or longitudinally across the long side surface 20, and the long side surface 20 of the metal housing 17 is exposed from the slits 42. In addition, the protection film 41 may be disposed not only on the long side surfaces 20 but also on short side surfaces 21 and a bottom surface 22 as required.

Figure 6A:
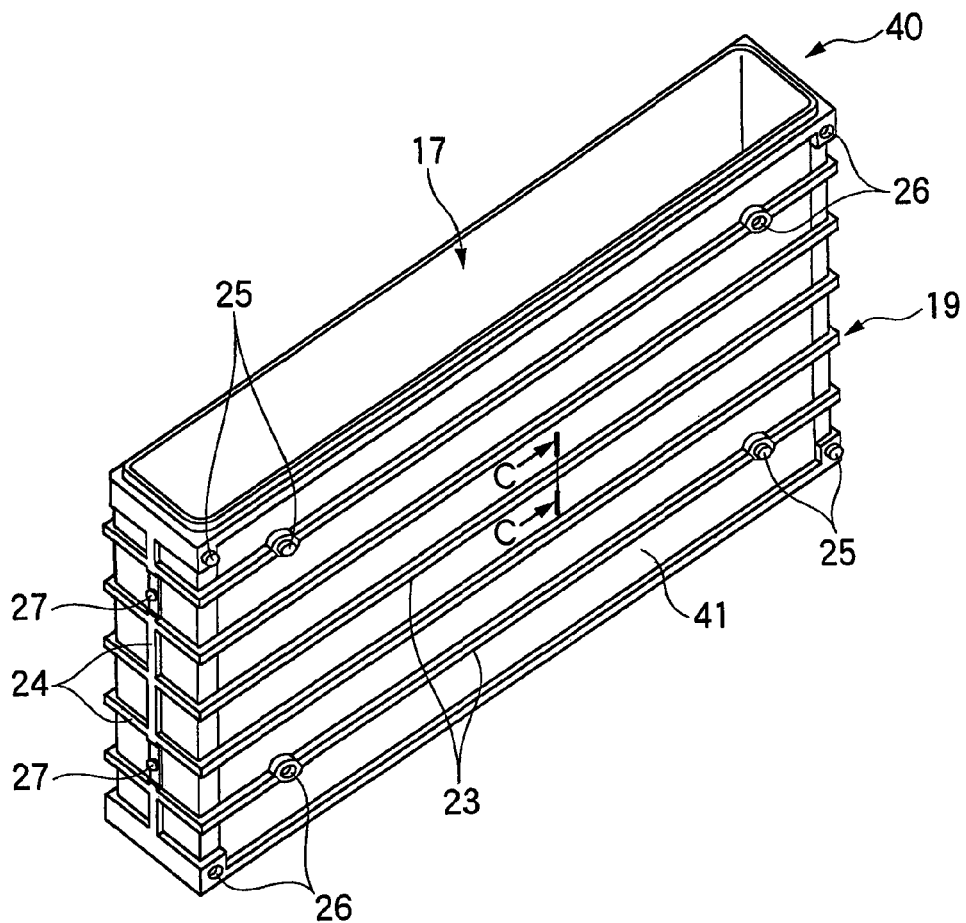
FIG. 6A is a perspective view of a metal battery case of the second embodiment.
Figure 6B:
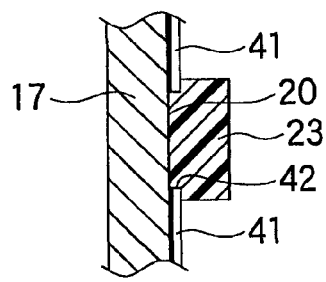
FIG. 6B is a sectional view taken along the line C-C and seen in a direction indicated by arrows C of FIG. 6A.
Figure 7A:
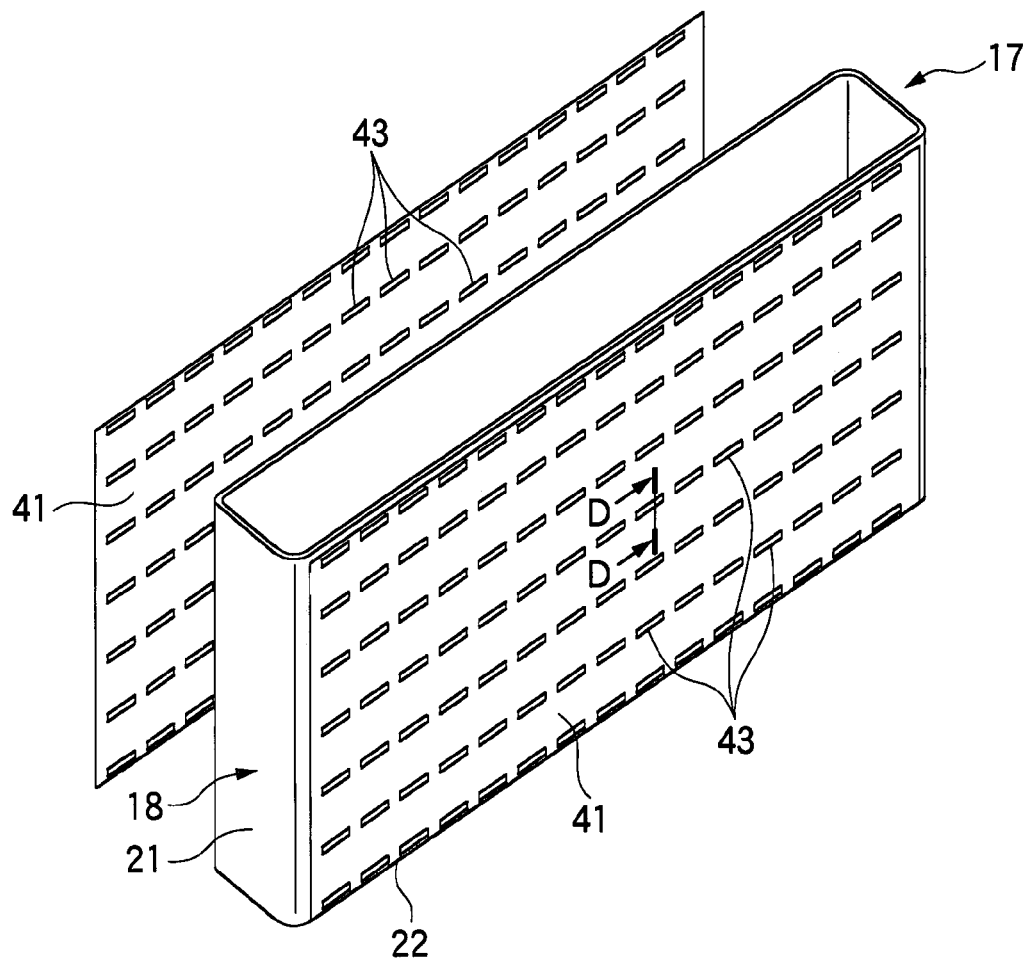
FIG. 7A is a perspective view of a metallic housing of a first modified example of the second embodiment with a protection film fastened temporarily on an external surface thereof.
Figure 7B:
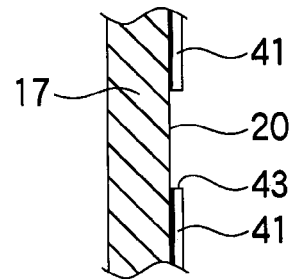
FIG. 7B is a sectional view taken along the line D-D and seen in a direction indicated by arrows D of FIG. 7A.
Figure 8A:
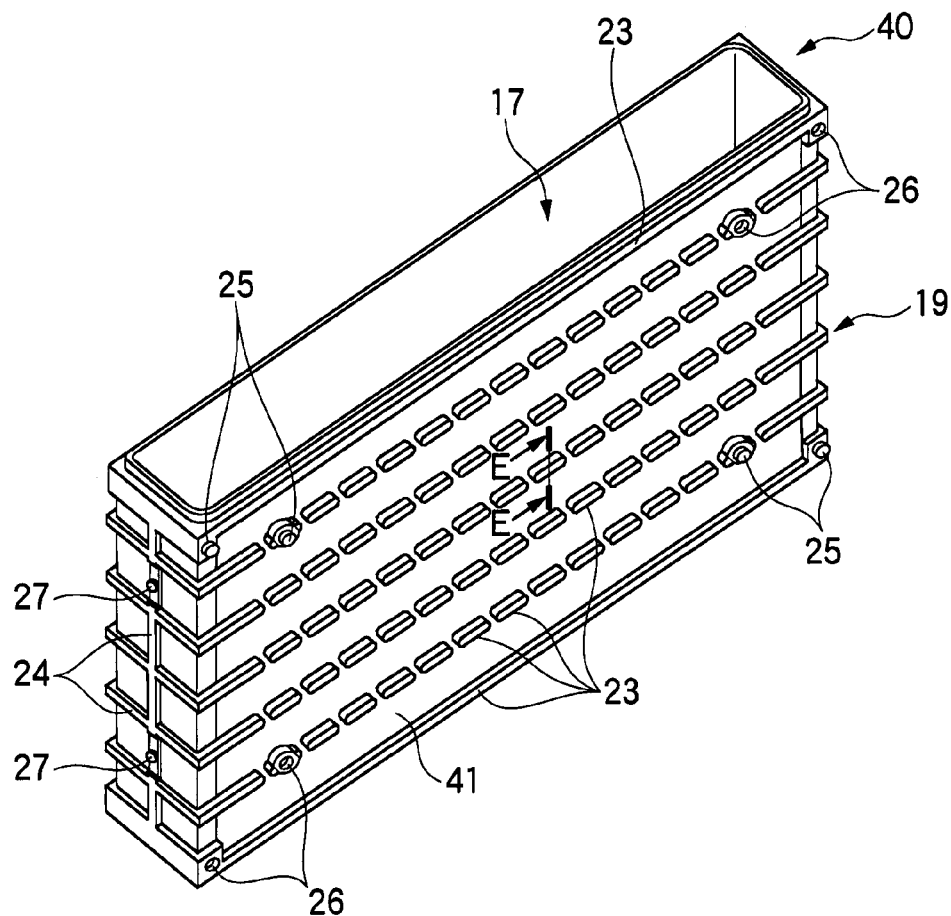
FIG. 8A is a perspective view of a metal battery case of the first modified example of the second embodiment.
Figure 8B:
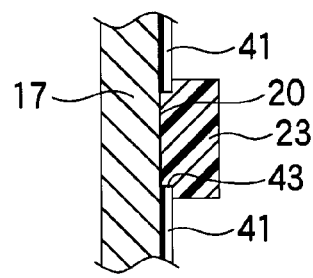
FIG. 8B is a sectional view taken along the line E-E and seen in a direction indicated by arrows E of FIG. 8A.
Figure 9A:
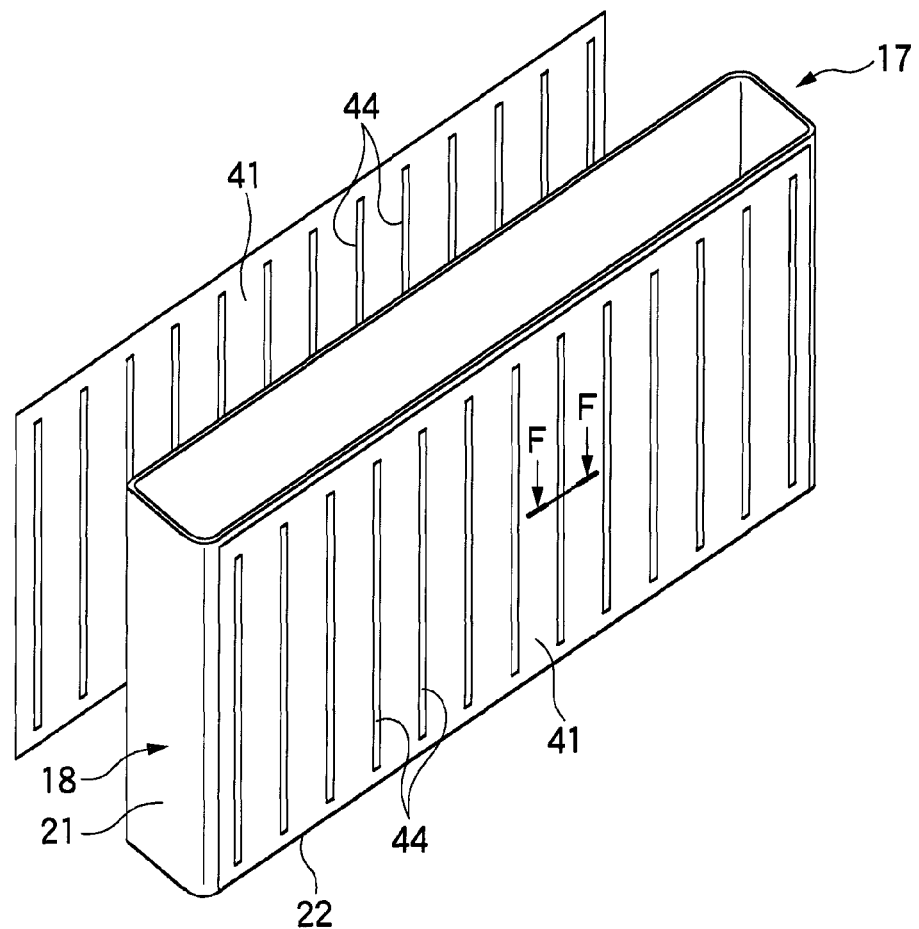
FIG. 9A is a perspective view of a metallic housing of a second modified example of the second embodiment with a protection film fastened temporarily on an external surface thereof.
Figure 9B:
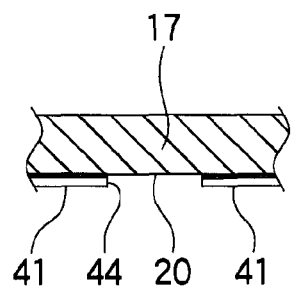
FIG. 9B is a sectional view taken along the line F-F and seen in a direction indicated by arrows F of FIG. 9B.
Figure 10A:
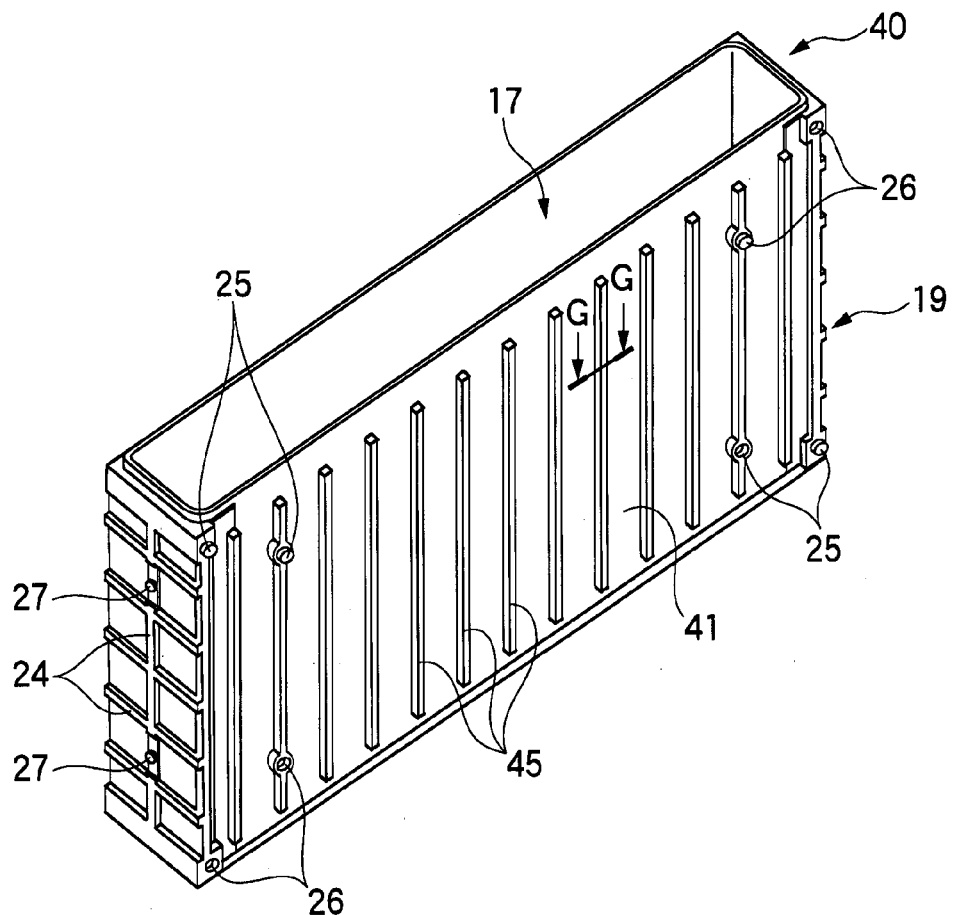
FIG. 10A is a perspective view of a metal battery case of the second modified example of the second embodiment.
Figure 10B:
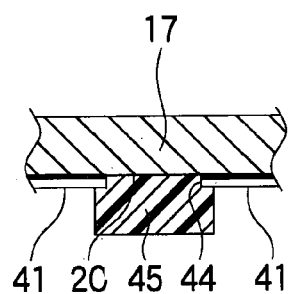
FIG. 10B is a sectional view taken along the line G-G and seen in a direction indicated by arrows G of FIG. 10A.

Next, a manufacturing method of the metal battery case 40 will be described. Firstly, a sheet of aluminum is deep drawn to be formed into a bottomed rectangular parallelepiped shape for manufacturing a metallic housing 17 (a working step). Following this, a special surface treatment is applied to an external surface 18 of the metallic housing 17 to form ultra minute irregularities of a nanometer level on the external surface 18 (a surface treatment step). Following this, protection films 41 are fastened temporarily on long side surfaces 20 of the metallic housing 17 with an adhesive or adhesive tape (a temporary film fastening step). Then, an insert molding is implemented with the metallic housing 17 inserted to the long side surfaces 20 of which the protection films 41 are temporarily fastened by the use of a normal injection molding machine to form ribs 23, 24, projecting portions 25, 27 and recessed portions 26 on the long side surfaces 20, short side surfaces 21 and a bottom surface 22 of the metallic housing 17 (a molding step). By this series of steps, as is shown in FIG. 6A, a synthetic resin enters dimples having, for example, a diameter of 20 to 30 nm which are formed on the external surface 18 which is exposed from the slits 42 in the protection films 41 to thereby mold a resin portion 19, whereby a metal battery case 40 is manufactured to the external surface 18 of which the resin portion 19 is fixed strongly and rigidly. In addition, since the resin portion 19 is molded in such a manner as to cover edge portions of the slits 42, even through the adhesive or adhesive tape for securing the protection films 41 to the external surface 18 of the metallic housing 17 is deteriorated with age, the protection films 41 remain fixed to the metallic housing 17 in the ensured fashion without being separated therefrom.

Thus, as has been described heretofore, according to the electricity storage system 10 of this embodiment, since the metal battery case 40 includes the angular metallic housing 17 in which the irregularities of the nanometer level are formed on the external surface 18, the protection films 41 which are disposed on the external surface 18 of the metallic housing 17 and the resin portion 19 which is integrally molded on the external surface 18 which is exposed from the protection films 41 on the metallic housing 17 through integral injection molding in such a manner as to cover the edge portions of the slits 42 in the protection films 41, the whole external surface 18 of the metallic housing 17 can be covered by the projection films 41 and the resin portion 19 without leaving any uncovered spaces, and therefore, a battery cell 11 can be protected electrically and mechanically. In addition, since the resin portion 19 is fixed to the external surface 18 strongly and rigidly in such a manner as to cover the edge portions of the slits 42 in the protection films 41, even though the adhesive with which the protection films 41 are secured to the external surface 18 of the metallic housing 17 is deteriorated with age, the protection films 41 can be kept fixed to the metallic housing 17 in the ensured fashion over a long period of time.

In addition, according to the electricity storage system 10 of the embodiment, since the protection films 41 take the form of sheet, compared with the conventional case where the metal battery case 40 is covered by heat-shrinkable tubes or the like, the metal battery case 40 can be covered with wrinkles and/or separation of the protection films 41 from the metallic housing 17 occurring in no case.

Additionally, according to the metal battery case 40 manufacturing method of the embodiment, the manufacturing method includes the working step of forming the angular metallic housing 17 by pressing the sheet metal, the surface treatment step of forming the irregularities of the nanometer level on the external surface 18 of the metallic housing 17, the temporary film fastening step of temporarily fastening the projection films 41 in the predetermined position on the external surface 18 of the metallic housing 17, and the molding step of implementing the insert molding with the metallic housing 17 inserted to mold the resin portion 19 integrally on the external surface 18 of the metallic housing 17 which is exposed from the protection films 41 in such a manner as to cover the edge portions of the slits 42 in the protection films 41, the metal battery case 40 can easily be manufactured in which not only is the resin portion 19 fixed strongly and rigidly to the external surface 18 of the metallic housing 17, but also the whole external surface 18 of the metallic housing 17 is covered by the protection films 41 and the resin portion 19 without leaving any uncovered spaces.

The other configuration, function and advantage of this embodiment are similar to those of the first embodiment.

In addition, as is shown in FIGS. 7A to 8B, as a first modified example to this embodiment, in place of the straight-line slits 42, a plurality of (seven in this modified example) broken slits 43 may be formed in the protection films 41 on the long side surfaces 20 in such a manner as to cross them horizontally or longitudinally. In addition, in this modified example, although ribs 23 are formed continuously in the horizontal or longitudinal direction at upper edge portions and lower edge portions of the long side surfaces 20, a plurality of (five in this modified example) ribs 23 are formed in a middle portion of each long side surface 20 in such a manner as to extend to cross the long side surface 20 in a broken-line fashion in positions which match the positions of the slits 43 which are formed in the protection films 41 in the similar broken-line fashion.

In addition, as a second modified example to this embodiment, as is shown in FIGS. 9A to 10B, in place of the slits 42 which are formed in the protection films 41 on the long side surfaces 20 in such a manner as to cross them in the horizontal or longitudinal direction, a plurality of (13 in this modified example) slits 44 may be formed in the protection films 41 on the long side surfaces 20 in such a manner as to cross them in a vertical direction. In addition, in this modified example, straight-line ribs 45 are formed in a vertical direction on the long side surfaces 20 of the metallic housing 17 in positions which match respectively the positions of the slits 44 in the protection films 41.

Third Embodiment

Firstly, referring to FIGS. 11 to 16, a third embodiment of an electricity storage system and a manufacturing method of a metal battery case according to the invention will be described.

As is shown in FIGS. 11 to 16, an electricity storage system 110 of this embodiment is made up of four stacked battery cell modules 112 each having four battery cells 111 such as lithium batteries which are connected integrally in a straight line. Namely, the electricity storage system 110 is made up of 16 battery cells 111.

Figure 13:
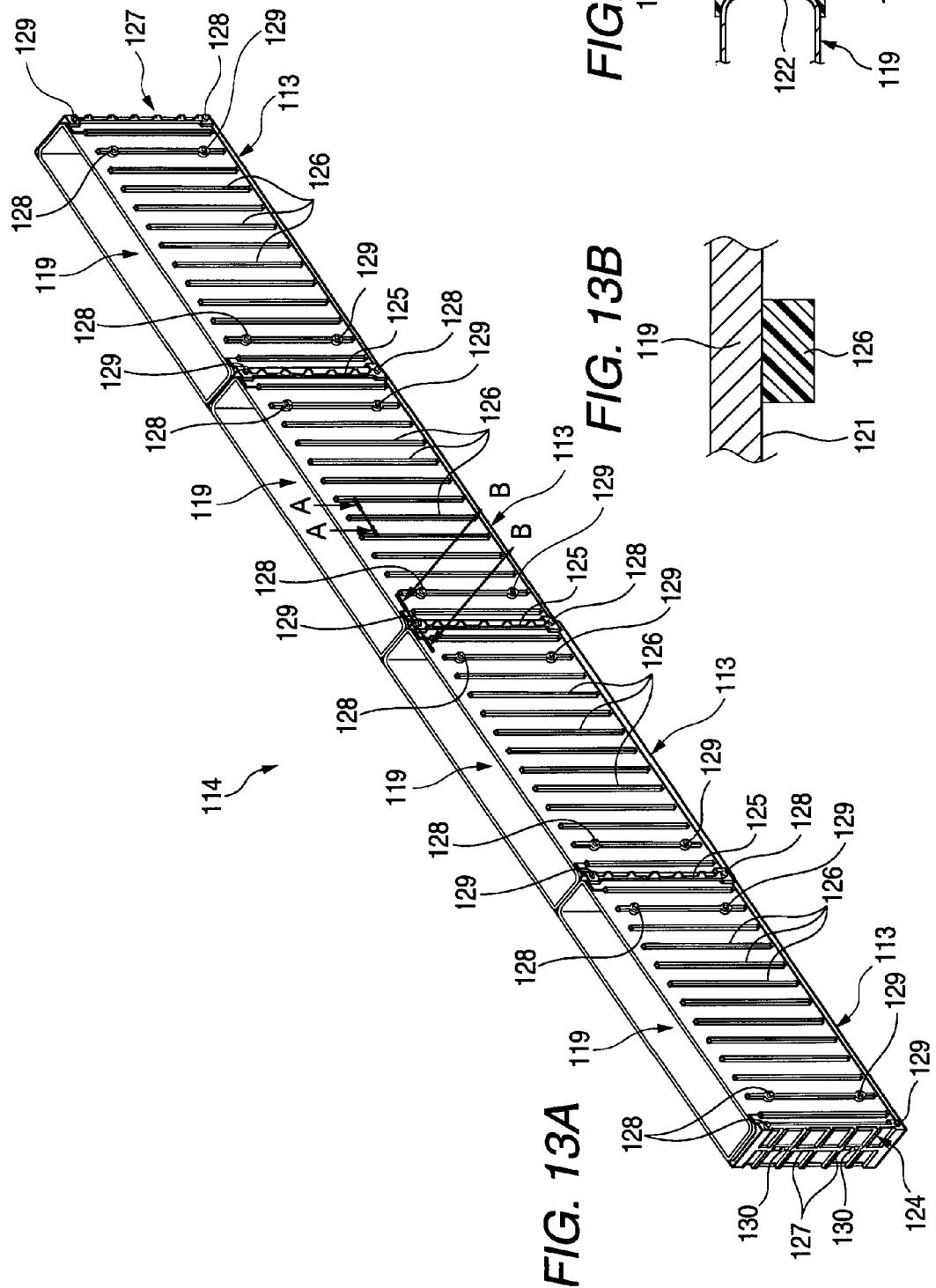
FIG. 13A is a perspective view of a metal battery case assembly according to a third embodiment of the electricity storage system according to the invention.
FIG. 13B is a sectional view taken along the line A-A and seen in a direction indicated by arrows A of FIG. 13A.
FIG. 13C is a sectional view taken along the line B-B and seen in a direction indicated by arrows B of FIG. 13A.
Figure 14:
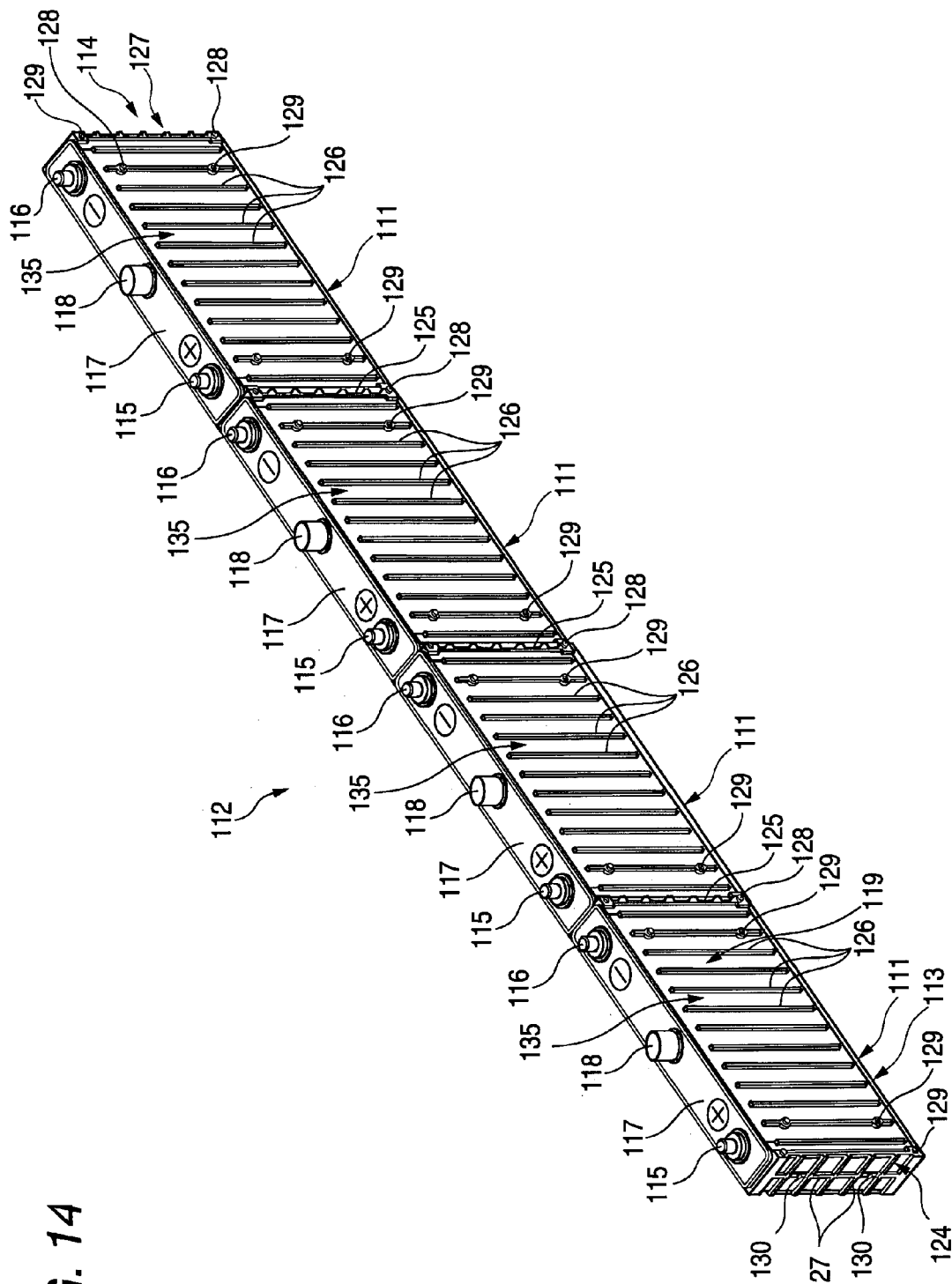
FIG. 14 is a perspective view of a battery cell module of the third embodiment of the electricity storage system according to the invention.
Figure 15:
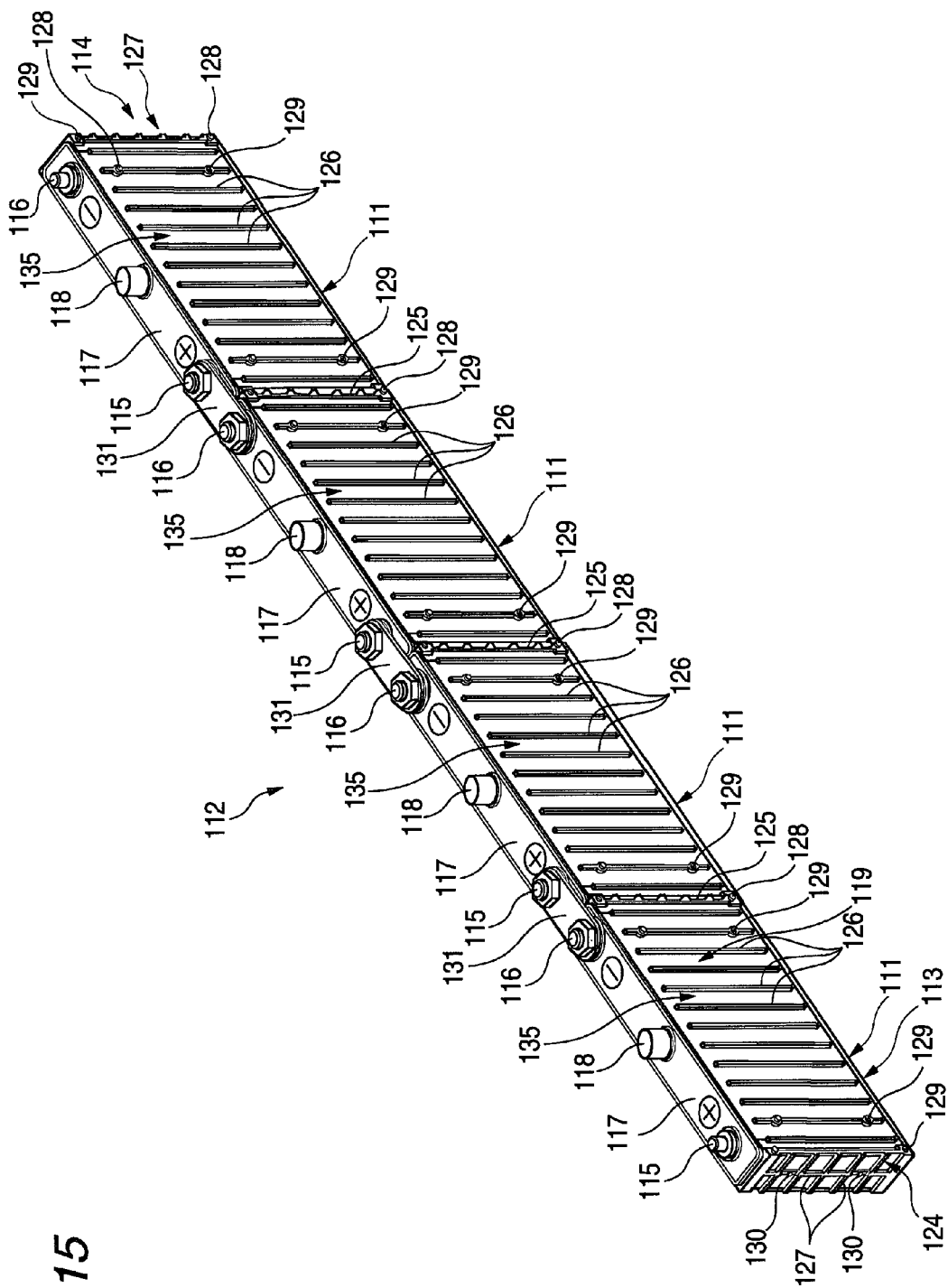
FIG. 15 is a perspective view illustrating a state in which positive terminals and negative terminals of the battery cell module shown in FIG. 14 are connected together by conductive members.

As is shown in FIGS. 13A to 14, the battery cell module 12 includes mainly a metal battery case assembly 114 in which four angular metal battery cases 113 each having a rectangular parallelepiped external shape are connected integrally in a straight line, battery elements, not shown, which are accommodated within the metal battery cases 113 with positive terminals 115 and negative terminals 116 electrically connected together, and lid portions 117 which close upper openings of the respective metal battery cases 113. In addition, as is shown in FIG. 15, the four battery cells 111 are disposed in such a manner that the positive terminals 115 and the negative terminals 116 are aligned alternately, and the adjacent positive terminals 115 and negative terminals 116 are electrically connected together by conductive members 131 such as copper plates.

The lid portion 117 is joined to the upper opening of the metal battery case 113 with the positive terminal 115 and the negative terminal 116 exposed to the outside, and a gas discharge valve 118 is provided at a substantially central portion of the lid portion 117 for discharging gases produced within the battery cell 111.

Figure 11:
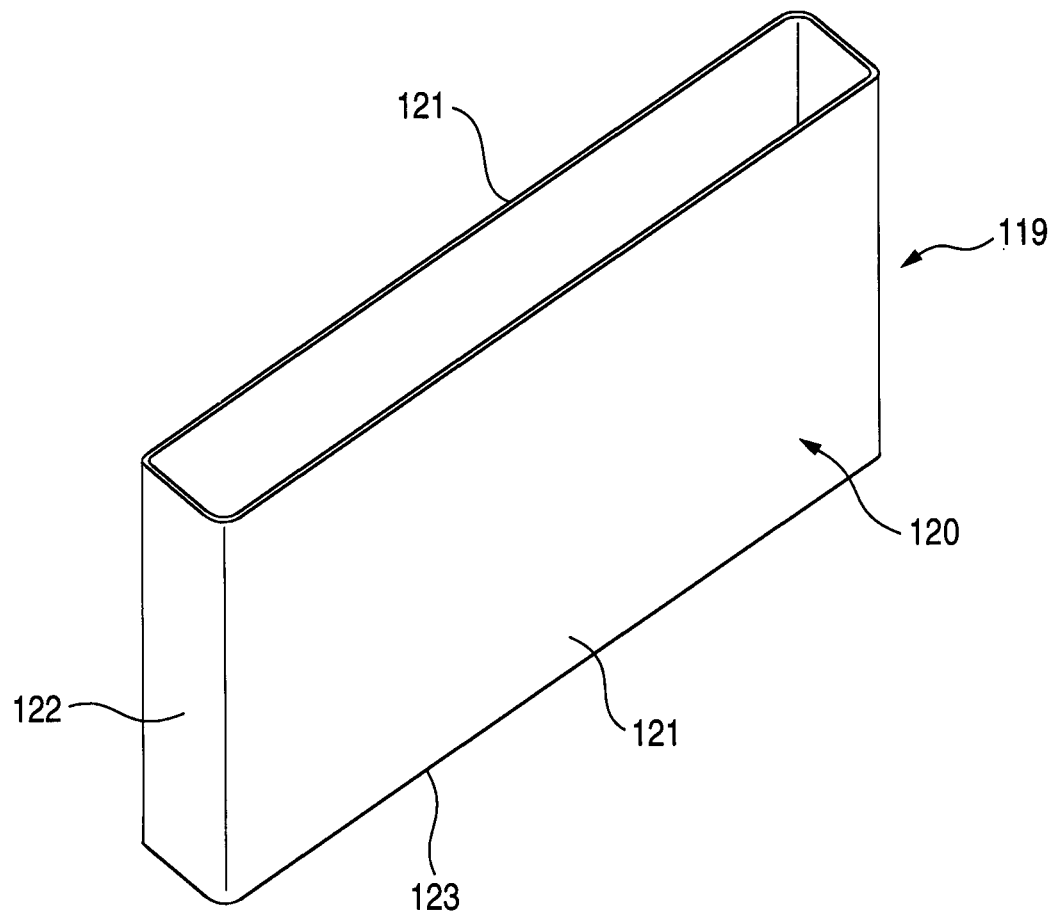
FIG. 11 is a perspective view illustrating a metallic housing constituting an electricity storage system and used in a metal battery case manufacturing method according to the invention.
Figure 12:
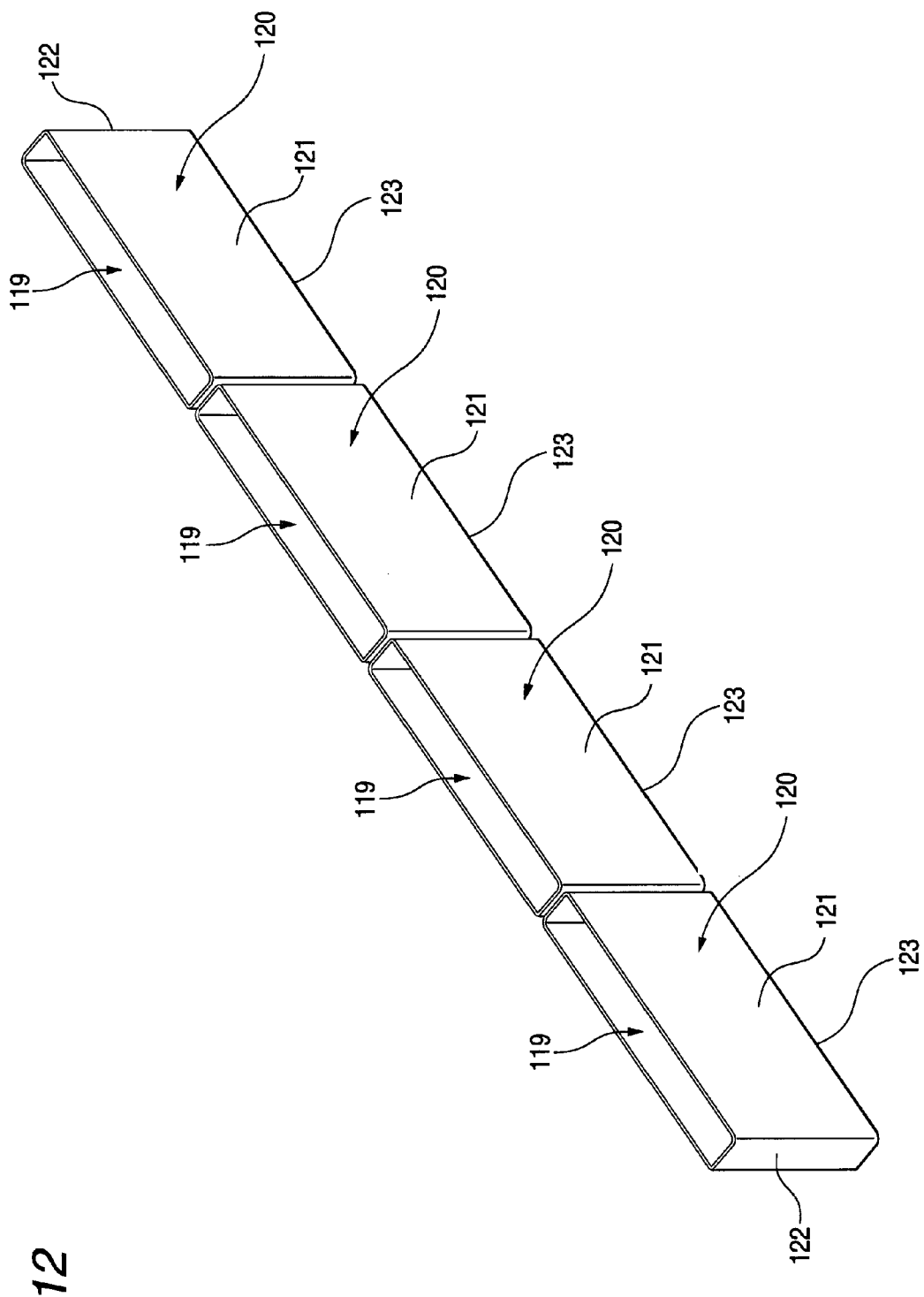
FIG. 12 is a perspective view illustrating a state in which metallic housings like the metallic housing shown in FIG. 11 are disposed to be aligned in a straight line.

As is shown in FIGS. 12 to 13C, the metal battery case assembly 114 includes four metallic housings 119 which are disposed to be aligned in a straight line, resin portions 124 which are formed on external surfaces 120 of the metallic housings 119, and connecting portions 125 which connect together short side surfaces 122 of the four adjacent metallic housings 119. In addition, the resin portions 124 and the connecting portions 125 are formed through insert molding with the four metallic housings 119 inserted in a synthetic resin material. Additionally, as is shown in FIG. 11, the metallic housing 119 is formed into a bottomed rectangular parallelepiped box shape by pressing a sheet of aluminum or a copper-based metal.

In addition, in this embodiment, the external surface 120 of the metallic housing 119 is subjected to a special surface treatment prior to injection molding and has ultra minute irregularities of a nanometer level (20 nm to 30 nm). In addition, the special surface treatment applied to the aluminum or copper-based metal surface will be described later.

The resin portions 124 are formed by insert molding from a synthetic resin such as a PBT resin or a PPS resin with the metallic housings 119 inserted in the synthetic resin and each have a plurality of ribs 126 which are formed on long side surfaces 121 of the metallic housing 119 in such a manner as to cross them in a vertical direction and a plurality of ribs 127 which are formed on short side surfaces 122 and a bottom surface 123 of the metallic housing 119 in such a manner as to cross them in horizontal and vertical directions.

On the ribs 126, circular cylindrical projecting portions 128 are formed in upper leftward and rightward positions, and circular recessed portions 129 are formed in lower leftward and rightward positions on the metal battery case 113. In addition, projecting portions 128 are also formed at a top left-hand side corner portion of the resin portion 124 on the metal battery case 113 at a left end and at a bottom right-hand side corner portion of the resin portion 124 on the metal battery case 113 at a right end of the metal battery case assembly 114. In addition, recessed portions 129 are formed at a bottom left-hand side corner portion of the resin portion 124 on the metal battery case 113 at the left end and at a top right-hand side corner portion of the resin portion 124 on the metal battery case 113 at the right end of the metal battery case assembly 114. Additionally, on a back side of the metal battery case 113, recessed portions 129 are formed in positions which correspond to the projecting portions 128 on the front side, while projecting portions 128 are formed in positions which correspond to the recessed portions 129 on the front side of the metal battery case 113. In addition, a pair of circular cylindrical projecting portions 130 is formed on each rib 127.

As is shown in FIG. 13C, the connecting portions 125 connect together the short side surfaces 22 of the four metallic housings 119 which are disposed to be aligned in the straight line, and a circular cylindrical projecting portion 128 is formed at a lower end portion on a front side and a circular recessed portion 129 is formed at an upper end portion on the front side of each connecting portion 125. In addition, on a back side of the connecting portion 125, a recessed portion 129 is formed in a position which corresponds to the projecting portion 128 on the front side and a projecting portion 128 is formed in a position which corresponds to the recessed portion 129 on the front side of the connecting portion 125.

In addition, an outside diameter of the projecting portion 128 is the same as an inside diameter of the recessed portion 129, whereby they can fit in and on each other. Thus, when the four battery cell modules 112 are stacked together, the projecting portions 128 and the recessed portions 129 are fitted in and on each other, whereby the adjacent four battery cell modules 112 are positioned relative to each other.

Figure 16:
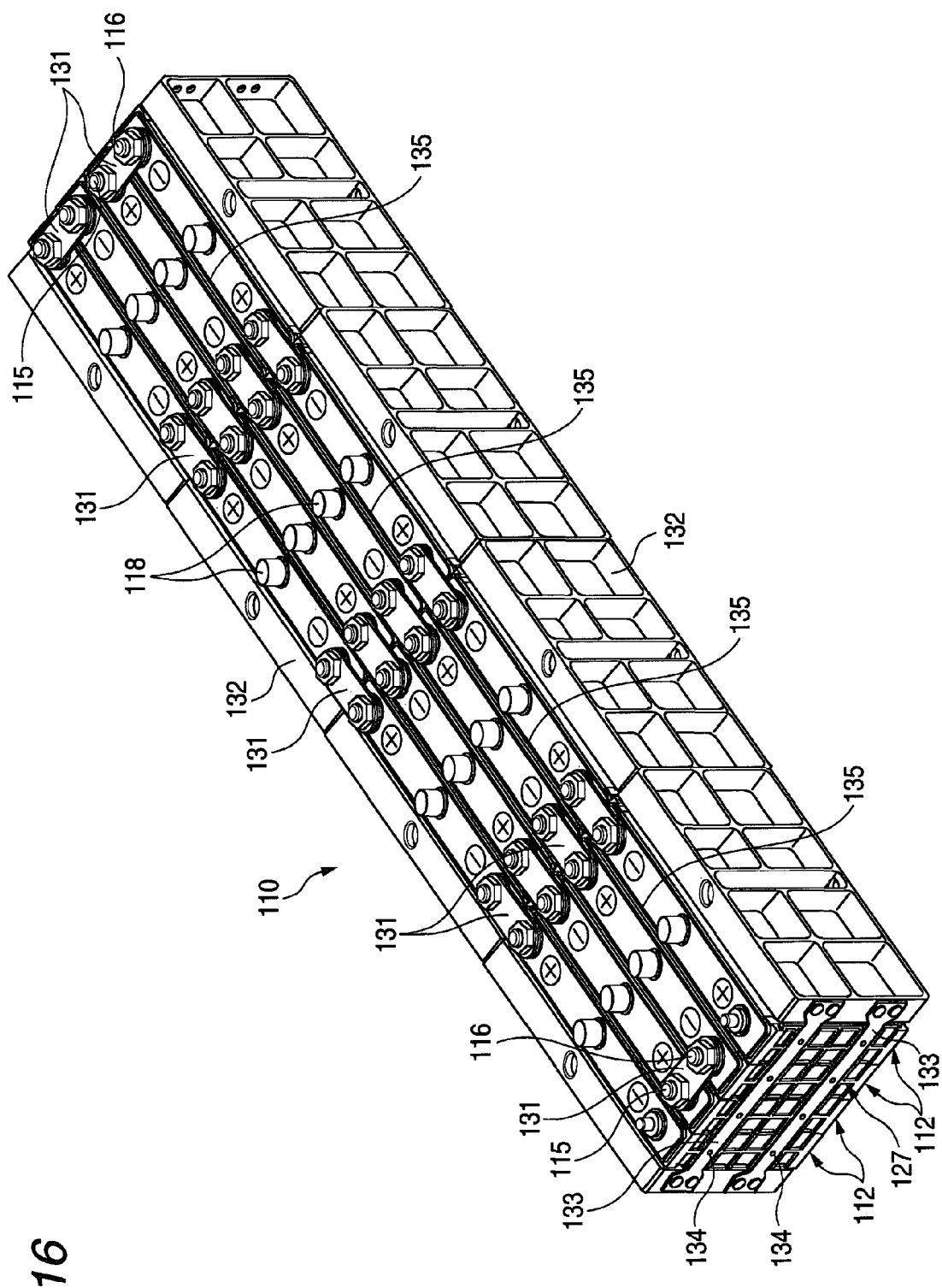
FIG. 16 is a perspective view of the third embodiment of an electricity storage system according to the invention.

In addition, as is shown in FIG. 16, the four stacked battery cell modules 112 are arranged in such a manner that the positive terminals 115 and the negative terminals 116 of the adjacent battery cell modules 112 are aligned alternately in a transverse direction thereof and are positioned relative to each other by the projecting portions 128 and the recessed portions 129 being fitted in and on each other. As this occurs, the ribs 126, 127 of the metal battery case assemblies 114 are brought into close contact with each other to configure a post-like structure, thereby making it possible to enhance the rigidity of the overall electricity storage system 110.

In addition, in this embodiment, as is shown in FIG. 16, highly rigid tight-pressing plates 132 are disposed at both ends of long side surfaces 121 of the four stacked battery cell modules 112. In addition, biding plates 133 in which engagement holds 134 are formed at constant intervals are disposed on both the short side surfaces 122 of the stacked battery modules 112, and the engagement holes 134 are caused to fit on the projecting portions 130 on the ribs 127 and both end portions of the binding plates 133 are fixed to the tight-pressing plates 132, whereby the stacked battery modules 112 are fixed altogether. In addition, the electricity storage system 110 is completed by connecting electrically the positive terminals 115 and the negative terminals 116 at both the end portions of the battery cell modules 112 together by conductive members 131.

In the electricity storage system 110 configured in the way described above, since cooling medium passageways 135 are defined between the adjacent battery cell modules 112 (between the battery cell modules 111) by the ribs 126 and the long side surfaces 121 of the battery cells 111, by cooling air or the like being caused to flow through these cooling medium passageways 135, heat generated in association with charging and discharging of the battery cells 111 is suppressed effectively so as to prevent an increase in temperature thereof, whereby a reduction in electric properties of the battery cells 111 is suppressed.

Next, a manufacturing method of the metal battery case assembly 114 (the metal battery case 113) will be described. Firstly, a sheet of aluminum is deep drawn to be formed into a bottomed rectangular parallelepiped shape for manufacturing a metallic housing 119 (a working step). Following this, a special surface treatment is applied to an external surface 120 of the metallic housing 119 to form ultra minute irregularities of a nanometer level on the external surface 120 (a surface treatment step). Then, four metallic housings 119 to the external surfaces 120 of which the special surface treatment was applied are, as is shown in FIG. 12, disposed to be aligned in a straight line and an insert molding is implemented with the metallic housings 119 inserted by the use of a normal injection molding machine so as to connect together the short side surfaces 122 of the four adjacent metallic housings 119 by connecting portions 125 as is shown in FIG. 13A. At the same time, ribs 126, 127, projecting portions 128, 130 and recessed portions 129 which configure a resin portion 124 are formed on long side surfaces 121, short side surfaces 122 and a bottom surface 123 of the metallic housings 119 (a molding step). By this series of steps, a synthetic resin enters dimples having, for example, a diameter of 20 to 30 nm which are formed on the external surfaces 120 by the special surface treatment to thereby mold resin portions 124 and connecting portions 125, whereby a metal battery case assembly 114 is manufactured to the external surfaces 120 of which the resin portions 124 and the connecting portions 125 are fixed strongly and rigidly.

In addition, as the special surface treatment adopted in this embodiment, an immersion treatment or an organic plated film treatment is adopted; in the immersion treatment, after an alkali treatment in which the metallic housing is immersed in an alkali solution and an acid treatment in which the metallic housing is immersed in an acid solution are carried out, the metallic housing is immersed in an irregularities forming solution, and in the organic plated film treatment, an organic plating treatment by a triazine dithiol dielectric is applied to the external surface 120 of the metallic housing 119 in an electrolytic cell containing an electrolyte in which triazine dithiol dielectric is dissolved in water or an organic solution so as to form a film of triazine dithiol dielectric on the metallic surface.

Then, battery elements, not shown, are accommodated in interiors of the respective metal battery cases 113, and an electrolyte is poured thereinto so that the battery elements are immersed therein. Thereafter, as is shown in FIG. 14, lid portions 117 are airtightly joined to upper openings of the metal battery cases 113, whereby a battery cell module 112 is manufactured.

Thus, as has been described heretofore, according the electricity storage system 110 of the embodiment, since the metal battery case assembly 114 is configured in such a manner that the four metallic housings 119 having the external surfaces 120 on which the irregularities of the nanometer level are formed are disposed to be aligned in the straight line and the external surfaces 120 of the four metallic housings 119 are connected together by the connecting portions 125 through insert molding, the metal battery case assembly 114 can be obtained in which the four metal battery cases 119 are connected together strongly and rigidly. In addition, since the resin portions 124 are formed on the external surfaces 120 of the metallic housings 119, the resin portions 124 can be fixed to the external surfaces 120 of the metallic housings 119 strongly and rigidly.

In addition, according the electricity storage system 110 of the embodiment, since the resin portion 124 configures the ribs 126 which are formed on the long side surfaces 121 of the metal battery case 113, the mechanical strength of the long side surfaces 121 of the metal battery case 113 can be enhanced, and therefore, the deformation of the long side surfaces 121 of the metal battery case 113 due to the internal pressure of the battery cell 111 can be prevented. Additionally, since the cooling medium passageways 135 through which cooling air or the like is allowed to flow can be formed between adjacent battery cells 111 when they are stacked together by the ribs 126 so formed, heat generated in association with charging and discharging of the battery cells 111 can be cooled effectively, thereby making it possible to prevent the increase in the temperatures of the battery cells 111, whereby the reduction in electric properties of the battery cells 111 can be suppressed. In addition, since separate members for forming the cooling medium passageways 135 do not have to be prepared additionally, a reduction in size and weight of the electricity storage system 110 can be realized, and the production costs thereof can also be reduced.

In addition, according the electricity storage system 110 of the embodiment, since the resin portion 124 configures the ribs 127 which are formed on the short side surfaces 122 and the bottom surface 123 of the metal battery case 113, the mechanical strength of the short side surfaces 122 and the bottom surface 123 of the metal battery case 113 can be enhanced, and therefore, the deformation of the short side surfaces 122 and the bottom surface 123 of the metal battery case 113 due to the internal pressure of the battery cell 111 can be prevented.

Additionally, according the electricity storage system 110 of the embodiment, since the resin portion 124 configures the ribs 127 which are formed on the short side surfaces 122 and the bottom surface 123 of the metal battery case 113 and when four metal battery case assemblies 114 are disposed to be stacked together, the metal battery case assemblies 114 so stacked together configure a post-like structure, the four metal battery case assemblies 114 can be assembled integrally, thereby making it possible to enhance the rigidity of the overall electricity storage system 110.

In addition, according to the electricity storage system 110 of the embodiment, since the resin portion 124 includes at least a recessed portion 129 and a projecting portion 128 which make a pair and when four metal battery case assemblies 114 are stacked together, the recessed portions 129 and the projecting portions 128 of the adjacent metal battery case assemblies 114 fit on and in each other to position the metal battery case assemblies 114 relative to each other, the four metal battery case assemblies 114 can easily be disposed so as to be stacked together, thereby making it possible to enhance the assembling properties of the electricity storage system 110. In addition, since the assembling rigidity of the four metal battery case assemblies 114 can be enhanced, the reliability and safeness of the electricity storage system 110 can be enhanced when it is used under severe service conditions as in a motor vehicle.

Additionally, according to the metal battery case 113 manufacturing method of the embodiment, since the manufacturing method includes the working step of pressing the sheet metal to form it into the angular metallic housing 119, the surface treatment step of forming the irregularities of the nanometer level on the external surface 120 of the metallic housing 119, and the molding step of implementing the insert molding with the four metallic housings 119 inserted which are disposed so as to be aligned in the straight line so as to connect the four metal battery case assemblies 114 integrally by the connecting portions 125 and the resin portions 124 are molded integrally on the external surfaces 120, the metal battery case assembly 114 can easily be manufactured in which the resin portions 124 are fixed strongly and rigidly to the external surfaces 120 of the metallic housings 119.

Fourth Embodiment

Next, referring to FIGS. 17A to 19B, a third embodiment of an electricity storage system and a manufacturing method of a metal battery case according to the invention will be described. Note that since an electricity storage system of this embodiment is similar to the electricity storage system of the third embodiment except that a resin portion and connecting portions are injection molded with protection films disposed on long side surfaces of a metallic housing, by imparting like reference numerals or corresponding reference numerals to like portions, the description thereof will be simplified or omitted.

As is shown in FIGS. 17A to 19B, a metal battery case 140 of this embodiment makes up a metal battery case assembly 145 which is formed by insert molding with four metallic housings 119 (refer to FIG. 11) inserted which, as with the third embodiment, have external surfaces 120 on which irregularities of a nanometer level are formed and which are disposed so as to be aligned in a straight line. The metal battery case assembly 145 includes connecting portions 125 which connect together the four metallic housings 119, protection films 141 which are fastened temporarily to long side surfaces 120 of the metallic housings 119 with an adhesive or adhesive tape and resin portions 124 which are integrally molded on the external surfaces 120 of the metallic housings 119 which are exposed from the protection films 141 in such a manner as to cover edge portions of the protection films 141.

The protection film 141 has insulation properties and has substantially the same size as that of the long side surface 121 so as to cover almost the whole surface of the long side surface 121. In addition, a plurality of (13 in this embodiment) slit 142 are formed in the protection film 141 in such a manner as to extend horizontally or longitudinally across the long side surface 120, and the long side surface 120 of the metal housing 119 is exposed from the slits 142. In addition, the protection film 141 may be disposed not only on the long side surfaces 120 but also on short side surfaces 122 and a bottom surface 123 as required.

Figure 17B:
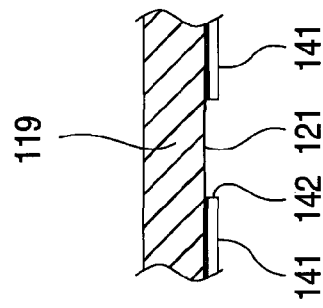
FIG. 17B is a sectional view taken along the line C-C and seen in a direction indicated by arrows C of FIG. 17A.
Figure 17A:
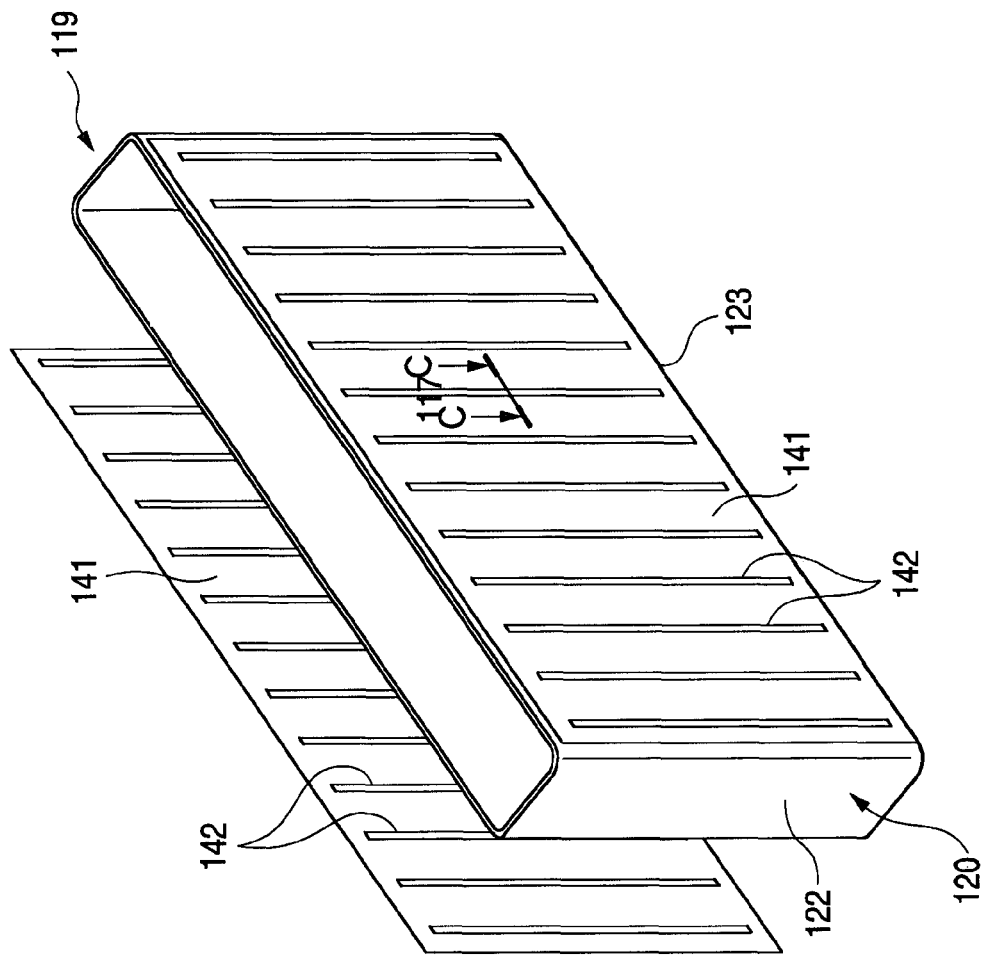
FIG. 17A is a perspective view of a metallic housing of a fourth embodiment of the electricity storage system according to the invention with a protection film fastened temporarily on an external surface thereof.
Figure 18:
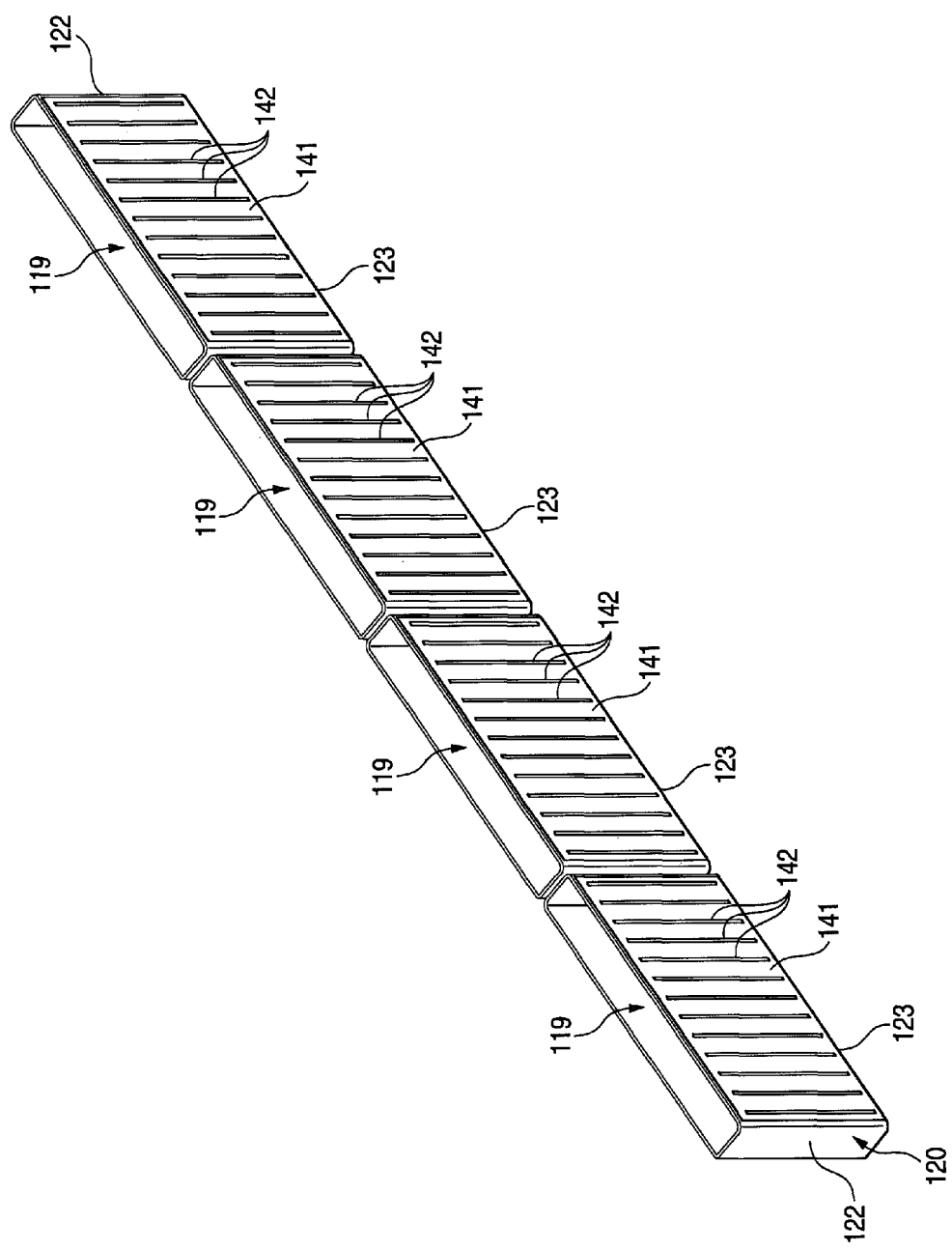
FIG. 18 is a perspective view illustrating a state in which metallic housings like the metallic housing shown in FIG. 17A are disposed to be aligned in a straight line.

Next, a manufacturing method of the metal battery case assembly 145 (the metal battery case 140) will be described. Firstly, a sheet of aluminum is deep drawn to be formed into a bottomed rectangular parallelepiped shape for manufacturing a metallic housing 119 (a working step). Following this, a special surface treatment is applied to an external surface 120 of the metallic housing 119 to form ultra minute irregularities of a nanometer level on the external surface 120 (a surface treatment step). Then, as is shown in FIG. 17A, protection films 141 are temporarily fastened to long side surfaces 121 of the metallic housing 119 with an adhesive or adhesive tape (a film temporary fastening step). Following this, as is shown in FIG. 18, four metallic housings 119 on long side surfaces 121 of which the protection films 141 are temporarily fastened are disposed so as to be aligned in a straight line, and as is shown in FIG. 19A, the four adjacent metallic housings 119 are connected together at short side surfaces 122 by connecting portions 125, while at the same time, ribs 126, 127, projecting portions 128, 130 and recessed portions 129 which configure resin portions 124 are formed on the long side surfaces 121, short side surfaces 122 and bottom surfaces 123 of the metallic housings 119 by insert molding with the four metallic housings 19 so aligned in the straight line inserted by the use of a normal injection molding machine (a molding step). By this series of steps, as is shown in FIG. 19B, a synthetic resin enters dimples having, for example, a diameter of 20 to 30 nm which are formed on the external surfaces 120 which are exposed from slits 142 in the protection films 141 to thereby mold resin portions 124 and connecting portions 125, whereby a metal battery case assembly 114 is manufactured to the external surfaces 120 of which the resin portions 124 and the connecting portions 125 are fixed strongly and rigidly.

In addition, since the resin portions 124 are molded in such a manner as to cover edge portions of the slits 142, even though the adhesive or adhesive tape is deteriorated with age, there occurs no such situation that the protection films are separated from the external surfaces 120, whereby the protection films 41 can be kept fixed to the metallic housings 119 without being separated therefrom.

As has been described heretofore, according to the electricity storage system 110 according to the embodiment, since the metal battery cases 140 have the external surfaces 120 on which the irregularities of the nanometer level are formed and configure the metal battery case assembly 145 which are formed by insert molding with the four metallic housings 119 inserted which are disposed so as to be aligned in the straight line and the metal battery case assembly 145 includes the connecting portions 125 which connect the four metallic housings 119 together, the protection films 141 which are disposed on the external surfaces 120 of the metallic housings 119 and the resin portions 124 which are formed on the external surfaces 120 which are exposed from the slits 142 in the protection films 141 in such a manner as to cover the edge portions of the slits 142 in the protection films 141, the whole external surfaces 120 of the four metallic housings 119 of the metal case assembly 145 can be covered by the protection films 141 and the resin portions 124 without any uncovered portions being left uncovered, thereby making it possible to protect the battery cells 111 electrically and mechanically. In addition, since the resin portions 124 are fixed to the external surfaces 120 of the metallic housing 119 strongly and rigidly in such a manner as to cover the edge portions of the slits 142 in the protection films 141, even though the adhesive or adhesive tape for fixing the protection films 141 to the external surfaces 120 of the metallic housings 119 are deteriorated with age, the protection films 141 can be kept fixed to the metallic housings 119 over a long period of time in an ensured fashion.

In addition, according to the electricity storage system 110 of the embodiment, since the protection film 141 takes the form of a sheet, compared with the conventional case where the metal battery case 140 is covered by heat-shrinkable tubes or the like, the protection film 141 can cover the metal battery case 140 without causing wrinkles and/or separation of the film 141 from the external surface 120 of the metal battery case 140.

Additionally, according to the manufacturing method of the metal battery case 140 of the embodiment, since the manufacturing method includes the working step of forming the angular metallic housing 119 by pressing the sheet metal, the surface treatment step of forming the irregularities of the nanometer level on the external surface 120 of the metallic housing 119, the temporary film fastening step of temporarily fastening the protection films 141 in the predetermined positions on the external surface 120 of the metallic housing 119, and the molding step of connecting together the four metallic housings 119 which are disposed so as to be aligned in the straight line by insert molding with the four metallic housings 119 inserted and at the same time, molding the resin portions 124 integrally on the external surfaces 120 of the metallic housings 119 which are exposed from the slits 142 in the protection films 141 in such a manner as to cover the edge portions of the slits 142 in the protection films 141, the metal battery case assembly 145 can easily be manufactured in which the resin portions 124 are fixed to the external surfaces 120 of the metallic housings 119 strongly and rigidly and the whole external surfaces 120 of the metallic housings 119 are covered by the protection films 141 and the resin portions 124 without any uncovered portions being left uncovered and in which the four adjacent metallic housings 119 are connected together by the connecting portions 125 strongly and rigidly.

The other configurations, as well as function and advantage of the embodiment are the same as those of the third embodiment.

In addition, the invention is not limited to the respective embodiments that have been described heretofore but can be modified as required without departing from the spirit and scope of thereof.

For example, in the respective embodiments, while the resin portion is described as being the ribs, the invention is not limited thereto. However, any configuration may be adopted, provided that the configuration so adopted can form cooling medium passageways (spaces) which allow a cooling medium to pass or flow between the adjacent battery cells, and the passageways can take any arbitrary shapes such as circular, oval, rectangular and polygonal shapes.

What is claimed is:

1. An electricity storage system comprising:
a plurality of battery cells, each of which includes an angular metal battery case and a battery element accommodated in the metal battery case, the plurality of battery cells being electrically connected together and disposed in such a manner as to form spaces between the metal battery cases,
wherein each of the metal battery cases has:
an angular metallic housing having an external surface on which irregularities are formed, and
a resin portion which is integrally molded on the external surface of the metallic housing and on the irregularities formed thereon.

2. An electricity storage system as set forth in claim 1, wherein
the resin portion has ribs which are formed on long side surfaces of the metal battery case.

3. An electricity storage system as set forth in claim 2, wherein
the resin portion has ribs which are formed on at least either of short side surfaces and a bottom surface of the metal battery case.

4. An electricity storage system as set forth in claim 2, wherein the resin portion has ribs which are formed on at least on short side surfaces and a bottom surface of the metal battery case, and
wherein the plurality of battery cells are stacked together and the ribs of the resin portion of the adjacent battery cells configures a post-like structure.

5. An electricity storage system as set forth in claim 1, wherein the resin portion has at least a recessed portion and a projecting portion which make a pair, and
wherein the plurality of battery cells are stacked together, and the recessed portions and the projecting portions of the adjacent battery cells fit on and in each other so as to position the battery cells relative to each other.

6. An electricity storage system as set forth in claim 1, wherein
the irregularities on the external surface of the metal battery case are irregularities of a nanometer level.

7. An electricity storage system as set forth in claim 6, wherein
the irregularities of a nanometer level are formed by an immersion step of immersing the metal battery case in an irregular surface forming solution.

8. An electricity storage system as set forth in claim 6, wherein the nanometer level refers to 20 nm to 30 nm.

9. An electricity storage system as set forth in claim 1, wherein
> the irregularities on the external surface of the metal battery case are formed by a film of triazine dithiol dielectric which is formed on the external surface.

10. An electricity storage system as set forth in claim 1, further comprising:
> a protection film on the external surface of the metal battery case,
> wherein the resin portion is injection molded integrally on the external surface of the metal battery case which is exposed from the protection film in such a manner as to cover edge portions of the protection film.

11. An electricity storage system as set forth in claim 10, wherein
> the irregularities on the external surface of the metal battery case are formed by a film of triazine dithiol dielectric which is formed on the external surface.

12. An electricity storage system as set forth in claim 1, wherein resin portions of adjacent and/or stacked metallic housings are brought into close contact with one another to form a space between the adjacent and/or stacked metallic housings.

* * * * *